(12) United States Patent  
Gardiner

(10) Patent No.: US 10,668,707 B2  
(45) Date of Patent: Jun. 2, 2020

(54) METHOD FOR FABRICATING AN OBJECT

(71) Applicant: LAING O'ROURKE AUSTRALIA PTY LIMITED, North Sydney (AU)

(72) Inventor: James Bruce Gardiner, Chippendale (AU)

(73) Assignee: LAING O'ROURKE AUSTRALIA PTY LIMITED, North Sydney (AU)

( * ) Notice: Subject to any disclaimer, the term of this patent is extended or adjusted under 35 U.S.C. 154(b) by 389 days.

(21) Appl. No.: 15/502,108

(22) PCT Filed: Aug. 5, 2015

(86) PCT No.: PCT/AU2015/050438  
§ 371 (c)(1),  
(2) Date: Feb. 6, 2017

(87) PCT Pub. No.: WO2016/019434  
PCT Pub. Date: Feb. 11, 2016

(65) Prior Publication Data  
US 2017/0225445 A1    Aug. 10, 2017

(30) Foreign Application Priority Data  
Aug. 5, 2014    (AU) ................................ 2014903026

(51) Int. Cl.  
*B33Y 10/00*        (2015.01)  
*B29C 64/106*       (2017.01)  
(Continued)

(52) U.S. Cl.  
CPC ............ *B33Y 10/00* (2014.12); *B29C 64/106* (2017.08); *B29C 64/393* (2017.08); *B33Y 30/00* (2014.12);  
(Continued)

(58) Field of Classification Search  
CPC ..................................................... B33Y 10/00  
See application file for complete search history.

(56) References Cited

U.S. PATENT DOCUMENTS

| 5,807,437 A | 9/1998 | Sachs et al. |
| 8,147,910 B2 | 4/2012 | Kritchman |

(Continued)

FOREIGN PATENT DOCUMENTS

| EP | 2860020 A1 | 4/2015 |
| GB | 2410459 | * 8/2005 |
| WO | WO-2015061855 A1 | 5/2015 |

OTHER PUBLICATIONS

International Search Report for International Application No. PCT/AU2015/050438, dated Oct. 20, 2015.

(Continued)

*Primary Examiner* — Larry W Thrower  
(74) *Attorney, Agent, or Firm* — Marshall, Gerstein & Borun LLP

(57) ABSTRACT

A method for fabricating an object using an additive manufacturing process. The method involves a computer-controlled apparatus including a fabrication head for selectively fabricating material and a build area for receiving the fabricated material, and comprises the steps of the apparatus receiving computer instructions relating to the object geometry, and moving the fabrication head and the build area relative to each other, and selectively operating the fabrication head, to fabricate at least one bead of material in the build area corresponding with the object geometry, whereby the at least one bead has non-uniform thickness.

10 Claims, 29 Drawing Sheets

(51) Int. Cl.
*B33Y 30/00* (2015.01)
*B29C 64/393* (2017.01)
*B29C 48/05* (2019.01)
*B29C 48/00* (2019.01)
*B29C 48/02* (2019.01)
*B29C 48/25* (2019.01)
*B22F 3/00* (2006.01)

(52) U.S. Cl.
CPC ........... *B22F 3/008* (2013.01); *B29C 48/0021* (2019.02); *B29C 48/02* (2019.02); *B29C 48/05* (2019.02); *B29C 48/266* (2019.02)

(56) References Cited

U.S. PATENT DOCUMENTS

| | | |
|---|---|---|
| 2004/0145629 A1 | 7/2004 | Silverbrook |
| 2013/0323665 A1 | 12/2013 | Dinh et al. |
| 2015/0197063 A1 | 7/2015 | Shinar et al. |

OTHER PUBLICATIONS

Written Opinion of the International Searching Authority for International Application No. PCT/AU2015/050438, dated Oct. 20, 2015.

Written Opinion of the International Preliminary Examining Authority for International Application No. PCT/AU2015/050438, dated Aug. 4, 2016.

International Preliminary Report on Patentability for International Application No. PCT/AU2015/050438, dated Nov. 7, 2016.

* cited by examiner

METHOD FOR FABRICATING AN OBJECT

TECHNICAL FIELD

The present invention relates generally to fabricating objects and in particular, to fabricating an object with a computer-controlled 'additive manufacturing' apparatus.

BACKGROUND TO THE INVENTION

Additive manufacturing, commonly known as '3D printing', typically involves fabricating an object from successive, planar layers which form cross-sections of the object, responsive to computer instructions derived from a three-dimensional digital model of the object. Popular additive manufacturing techniques include fused deposition modeling (FDM), stereolithography (SLA) and selective laser sintering (SLS); all of which typically involving a 'printer head' moving across a gantry system and selectively fabricating material adjacent the printer head, either by selectively depositing molten material, solidifying liquid material or fusing powdered material, thereby fabricating the object.

Regardless of which additive manufacturing process is used, it is typical for each layer of the fabricated object to have a generally consistent, uniform thickness (disregarding imperfections in the surfaces of the layer due to the limitations or inaccuracies of the apparatus used). Also, generally, the thickness of each layer of the object is typically specified by a user or software, prior to fabricating the object, to be equal to all other layers. For example, if it is a priority to fabricate the object as fast as possible, the layer thickness is set to a maximum value, thereby reducing the time required to fabricate the object but resulting in a relatively rough or 'stepped' surface finish on the object. Alternatively, if it is a priority to fabricate the object having an accurate geometry and/or fine surface finish (known as printing at 'high resolution'), the layer thickness is set to a minimum value, thereby reducing roughness/step height and resulting in a smooth surface finish, but increasing the time required to fabricate the object.

In some scenarios, it is known to configure the apparatus to fabricate different portions of the object from different layer thicknesses for structural reasons. For example, when fabricating an object using a selective deposition process, it is known to configure the apparatus to fabricate the initial layers of the object at a 2'X' thickness dimension and the remaining layers at an 'X' thickness dimension. This ensures that the initial layers have sufficient heat to firmly adhere to a base of the apparatus to prevent the object moving during the remainder of the fabrication process, and/or to provide improved stability for the object during the fabrication process.

Similarly, the apparatus may be configured to fabricate different portions of the object from different layer thicknesses due to the geometry of the portion. For example, where the object comprises a first portion arranged as a cube and a second portion arranged as a domed roof on top of the cube, the apparatus may be configured to fabricate the cube from layers having a 5'X' thickness dimension and the domed portion from layers having an 'X' thickness dimension. This approach allows the first portion of the object, which comprises vertical walls only, to be fabricated as fast as possible, and the second portion of the object, which comprises curved walls (which are most susceptible to forming a stepped appearance), to be fabricated more slowly, thereby achieving an acceptable surface finish on both portions of the object and minimising build time where possible.

Regardless of which approach is taken, objects fabricated in successive layers as described above often suffer from a number of problems. For example, as each layer is generally parallel to each other and planar, the bond between adjacent layers is relatively weak. This can mean that when the object is exposed to certain environmental conditions (e.g. exposure to temperature variation, dust, chemicals and/or moisture) or mechanical stresses, the bond between layers can degrade and the layers delaminate from each other. This is can be fatal to the functionality of the object. Furthermore, the geometry of the object able to be fabricated in successive, planar layers is inherently limited, meaning that some geometries cannot be fabricated or may require additional support structures to be constructed to support the object during the fabrication process, increasing the complexity of the process, time required and cost.

Accordingly, it would be useful to provide an alternative method of fabricating an object with an additive manufacturing process which provides an improved bond between fabricated layers or otherwise reduces the problems associated with fabricated objects delaminating. Furthermore, it would be useful to provide a solution that avoids or ameliorates any of the disadvantages present in the prior art, or which provides another alternative to the prior art approaches.

SUMMARY OF THE INVENTION

According to one aspect of the invention, there is provided a method for fabricating an object using a computer-controlled apparatus, the apparatus having a fabrication head for selectively fabricating material and a build area for receiving fabricated material, at least one of the fabrication head and build area being movable relative to each other and the fabrication head being selectively operable to fabricate the material responsive to computer instructions, the method comprising the steps of: receiving, by the apparatus, computer instructions relating to the object geometry; and moving at least one of the fabrication head and build area, and selectively operating the fabrication head, to fabricate at least one bead of material in the build area corresponding with the object geometry, the at least one bead having non-uniform thickness.

Other aspects are disclosed.

BRIEF DESCRIPTION OF THE DRAWINGS

Preferred embodiments of the invention will now be described, by way of example only, with reference to the accompanying drawings in which.

DETAILED DESCRIPTION OF PREFERRED EMBODIMENTS

Figure 1:
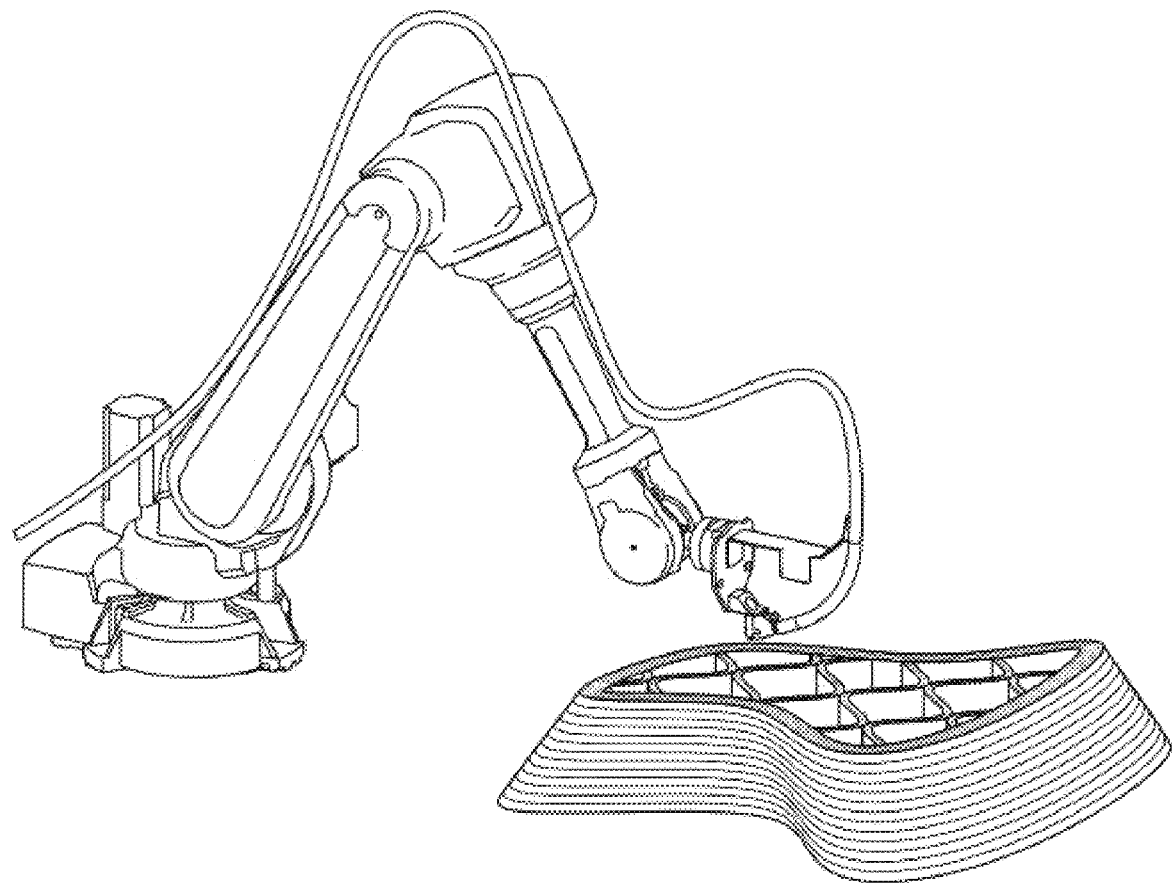
FIG. 1 is a perspective view of an apparatus selectively depositing material to fabricate an object.

The present disclosure relates to a method for fabricating an object using a computer-controlled apparatus, the apparatus having a fabrication head for selectively fabricating material which is arranged proximal to a build area for receiving fabricated material, whereby at least one of the fabrication head and build area are movable relative to each other, and the fabrication head is selectively operable to fabricate the material, responsive to computer instructions, the method comprising the steps of: receiving, by the apparatus, computer instructions relating to the object geometry; and moving at least one of the fabrication head and build area, and selectively operating the fabrication head, to fabricate at least one bead of material in the build area corresponding with the object geometry, the at least one bead having non-uniform thickness.

The disclosed methods and apparatus allow non-uniform thickness beads of material to be fabricated, such that the non-uniform thickness beads together form the object. This may involve fabricating beads of material having non-uniform height and/or non-uniform width, whereby both dimensions may be selectively varied during a fabrication process. This advantageously allows the geometry of each bead of fabricated material to be adjusted to be suitable for the functional and/or aesthetic requirements of the object, therefore providing an optimised object. For example, the non-uniform thickness geometry may allow adjacent beads to be fabricated having mating portions which interlock, such as a projection extending from a first bead mating with a recess in a second bead, thereby providing a delamination-resistant structure. Alternatively, the non-uniform thickness geometry may allow tapered or undulating thickness beads to be fabricated, to form a specific surface finish and provide a desired appearance. Similarly, the non-uniform thickness geometry may allow cavities or voids to be created between adjacent beads, to allow a fluid to travel therethrough to control the temperature or ventilation of the object, or provide the object with desirable properties, such as being elastically compressible.

The disclosed methods involve fabricating non-uniform thickness beads of material with an additive manufacturing ('3D printing') apparatus. Suitable apparatus generally involve selectively expelling material therefrom, in specific locations, to form the beads. Alternatively or additionally, suitable apparatus generally involve selectively fusing, bonding or solidifying portions of a volume of material, typically arranged in a reservoir or container, in specific locations, to form the beads. The apparatus is generally guided by computer instructions derived from a digital model of the beads, whereby the computer instructions direct the operation of the apparatus to fabricate the beads having corresponding geometry to the digital model.

The disclosed methods and apparatus are generally directed to fabricating non-uniform thickness beads of material until the fabricated non-uniform thickness beads form a desired object geometry. Often, the object will be fabricated from successive layers of material, whereby each layer comprises at least one non-uniform thickness bead. Adjacent layers are often interlocked due to the non-uniform width and/or height geometry of the beads arranged therein.

In FIG. 1 a computer-controlled selective deposition apparatus 10 for fabricating an object is shown, comprising a robotic arm 11 secured adjacent a build area (not demarcated), being a region which the robotic arm 11 can access and fabricate an object 13 therein, which includes a base surface 12 on which the object 13 is supported. The arm 11 includes a deposition head 14 in communication with a supply of material via a hose 15 and is adapted to selectively expel the material therefrom. The arm 11 has a plurality of sections rotatably connected to one another, allowing the arm 11 to move the deposition head 14 relative to the base surface 12 in all three dimensions. Optionally, at least a portion of the build area, such as the base surface 12, is also movable, thereby moving the object 13 relative to the deposition head 14. Further optionally, the robotic arm 11 is also movable across the surface 12.

The deposition head 14 is adapted to receive a supply of the material and selectively deposit the material therefrom to form at least one bead of the material, responsive to computer instructions derived from a three-dimensional digital model of the object 13. The material is typically supplied in a substantially liquid or molten form and hardens rapidly after deposition. Alternatively, the material is supplied in granulated or pellet form and melted prior to deposition. It will be appreciated that the term 'deposition' includes all known methods of adding material to a region to form a structure within its scope, such as jetting liquid material, spraying (and optionally binding) granular material, or selectively welding powdered material.

The object 13 is formed from a plurality of planar layers 131, each including at least one bead of the material deposited by the deposition head 14. Each layer 131 may include a single, continuous bead or a plurality of discrete beads. Similarly, all layers 131 may be formed from a single, continuous bead.

Figure 2:
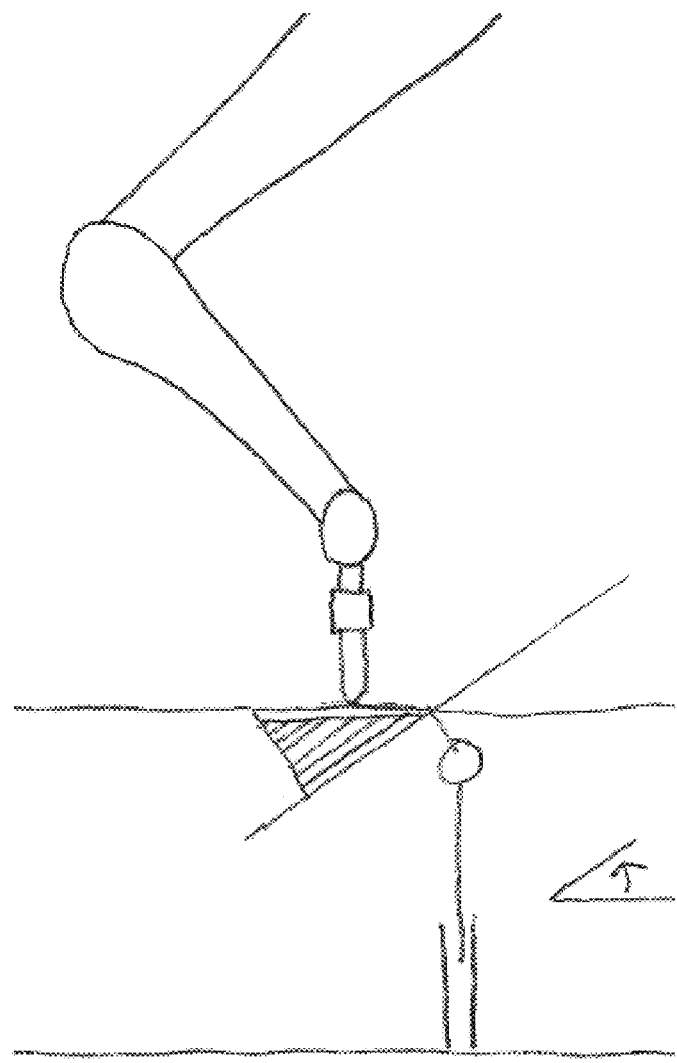
FIG. 2 is a perspective view of an alternative apparatus selectively curing material to fabricate an object.

In FIG. 2 a computer-controlled selective solidification apparatus 20 for fabricating an object is shown, comprising a robotic arm 21 arranged above and movable relative to an alternative build area, and fabricating an object 26 therein. The build area includes a reservoir 22 filled with a substantially liquid, curable material 23 forming a top surface 24. The robotic arm 21 is connected to an activation head 25 adapted to selectively solidify the curable material 23, responsive to computer instructions derived from a three-dimensional digital model of the object 26. Typically, the activation head 25 includes an energy source (not shown) and/or a nozzle (not shown) in communication with a chemical agent and adapted to expel the agent therefrom, the energy source and chemical agent configured to rapidly cure the curable material 23 upon exposure to the curable material 23.

The activation head 25 is typically moved by the robotic arm 21 relative to the top surface 24 and selectively operated proximally thereabove to expose specific portions of the top surface 24 to the energy source and/or chemical agent, causing the curable material 23 at the specific portions to cure, thereby forming at least one bead of solidified material, until the object 26 is fabricated. Alternatively, the activation head 25 is moved and operated within the volume of curable material 23, below the top surface 24. This may involve the activation head 25 comprising two light sources (not shown) which are selectively focused to form a light beam, thereby providing the necessary spectrum of light to cure the curable material 23, whereby the thickness of the light beam controls the thickness of the bead of material solidified. Alternatively, the activation head 25 may include a nozzle for expelling a high pressure gas, such as supercritical carbon, to penetrate the curable material 23 and insert the chemical agent therein to selectively cure portions of the curable material 23, whereby the size of an aperture of the nozzle controls the thickness of the beads of material solidified.

Optionally, a platform 27 for supporting solidified curable material 23 which forms the object 26 is arranged within the reservoir 22 and is movable and potentially also rotatable around at least one axis in order to reposition and reorientate the object 26 relative to the top surface 24 and/or the activation head 25. Alternatively, the object 26 is fabricated on a stationary structure (not shown) arranged in the reservoir 22, or a portion of the reservoir 22 itself, and the volume of curable material 23 contained in the reservoir is adjusted to allow different portions of the material 23 to be selectively solidified.

Figure 3:
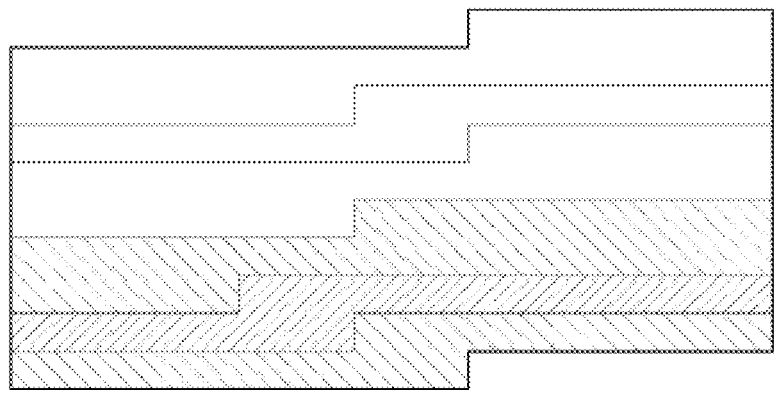
FIG. 3 is a cross-section detail of an object.

FIG. 3 shows a cross-section of an object 30 fabricated with the apparatus 10, 20 shown in FIG. 1 or FIG. 2. The object 30 comprises a plurality of non-uniform thickness beads 31 to form respective layers arranged on top of one another. Each bead 31 is fabricated by the apparatus 10, 20 moving from left to right fabricating material and also adjusting a height dimension of the bead 31 in at least one location. Each bead 31 is fabricated having two top surfaces 32 spaced apart from each other by a step 33, such that the step 33 of adjacent beads 31 mate to interlock the adjacent beads 31 together. Each bead comprises at least two portions having a different thickness dimension. For example, the lower most bead 37 has a first portion 34 having a first thickness dimension and a second portion 35 having a second thickness dimension which is greater than the first thickness dimension.

The object 30 is fabricated by the apparatus 10, 20 responsive to the computer instructions provided to the apparatus 10, 20 relating to the object 30 geometry. The computer instructions are typically derived from a three-dimensional (3D) model of the object 30 created by a user and/or algorithm operating computer-aided design (CAD) software. The software then provides the apparatus 10, 20 with instructions necessary to direct the apparatus 10, 20 to fabricate the plurality of beads 31 until the object 30, corresponding with the 3D model geometry, has been fabricated.

The geometry of each bead 31 and/or layer of the object 30 is determined according to a manual and/or automated process. For example, once the 3D model of the object 30 has been created, the user manually dissects the model into the plurality of beads 31 having a desired geometry. Alternatively, an algorithm is executed by the software which automatically dissects the 3D model into the plurality of beads 31. This may be due to the user defining a range of criteria or desired properties which affect how the algorithm dissects the 3D model. For example, the user may define a required resolution (smoothness of external surfaces), causing the algorithm to calculate the geometry of each bead 31 responsive to the geometry of external surfaces of the object 30, in order to optimise the surface finish of the object 30 whilst fabricating the object 30 as quickly as possible. Alternatively, the user may define forces which the object will be subjected to during use, causing the algorithm to calculate the geometry of each bead 131 such that a surface contact area between adjacent beads 131 provides sufficient adhesion, and therefore a sufficiently strong mechanical bond, to withstand the forces. The algorithm may involve an iterative calculation process whereby multiple different geometry solutions are generated, assessed against one or more performance criteria and selected, modified or discarded accordingly between each iteration, thereby optimising the object 30 geometry.

Where the object 30 is fabricated by the apparatus 10 shown in FIG. 1, each bead 31 is typically fabricated by the deposition head 14 moving across the base surface 12 at a constant speed and simultaneously varying the flow rate of the material being deposited and moving the deposition head 14 perpendicular to the base surface 12. By adjusting the distance between the deposition head 14 and the base surface 12, the distance between the top surface 32 of the bead 31 and the base surface 12 (or a previously deposited bead 31) is adjusted. Further, by varying the flow rate of the material being deposited, the volume of subsequently deposited material is adjusted. Performing both of these actions simultaneously results in the thickness of the bead 31 being adjusted whilst a bottom surface 36 of the bead 31 maintains contact with the base surface 12 (or the previously fabricated bead 31), and the width of the bead 31 is maintained relatively constant.

Optionally, the deposition head 14 may further comprise a planar guide surface (not shown) extending away from and surrounding a nozzle (not shown) adapted to expel the material therefrom. Each bead 31 may then be fabricated by arranging the planar guide surface parallel to the base surface 12 and moving the nozzle parallel to the base surface 12 at a constant separation distance, whilst adjusting the flow rate of the material being deposited. This causes the deposited bead 31 to be compressed between the base surface 12 and planar guide surface, thereby fabricating the bead 31 having a constant thickness and variable width. Similarly, the guide surface, or additional guide surfaces, may be arranged perpendicular to the base surface 12 to control the width of the bead 32 being fabricated.

Where the object 30 is fabricated by the apparatus 20 shown in FIG. 2, each bead 31 is typically fabricated by the activation head 25 moving across the top surface 24 at a constant speed and simultaneously varying the curing rate of curable material 23 being cured and moving the platform 27 towards and away from the top surface 24. By varying the curing rate, the depth of a cured portion of bead 31 is adjusted. Further, by adjusting the distance between the platform 27 and the top surface 24, the distance between the bottom surface 36 of the bead and the top surface 24 is adjusted. Performing both of these actions simultaneously results in the thickness of the bead 31 being adjusted whilst the bottom surface 36 of the bead 31 remains in contact with the platform 27 (or previously fabricated bead 31), and the width of the bead 31 is maintained relatively constant.

The curing rate of the apparatus 20 may be adjusted by adjusting the intensity of the energy source in communication with the activation head 25, thereby adjusting energy per area of curable material per second, and/or adjusting the flow rate and/or concentration of the chemical agent expelled by the material activation head 25. Alternatively, the intensity of the energy source may remain constant and the material activation head 25 be moved towards or away from the top surface 24, adjusting the distance between the material activation head 25 and the top surface 24. As this distance is increased, the energy source intensity at the top surface 24 decreases, solidifying less curable material 23 and decreasing the depth of the bead 31.

Figure 4:
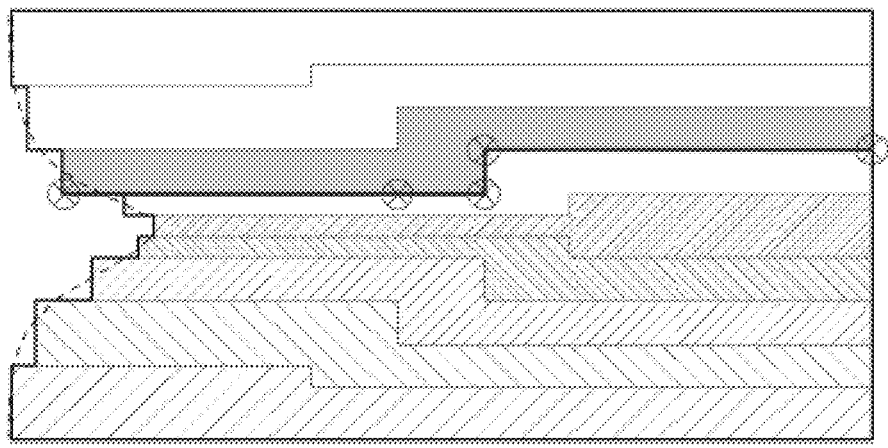
FIG. 4 is a cross-section detail of an alternative object.

FIG. 4 shows a cross-section of an alternative object 40 fabricated with the apparatus 10, 20 shown in FIG. 1 or FIG. 2. The object 40 comprises a plurality of non-uniform thickness beads 41 arranged in a stack of generally planar layers. Each bead 41 defines at least two top or bottom surfaces 42, 43 spaced apart from each other by a step 44. The steps 44 formed by adjacent beads 41 are complementary thereby interlocking the adjacent beads 41 together. At least some of the beads 41 have a plurality of portions having a different thickness.

A desired outer surface of the object 40 is shown as curved, dashed outer edge 45. As the object 40 is fabricated from the plurality of beads 41 in sequential layers, this inherently forms stepped outer edges 46 and does not identically follow the desired outer edge 45. To refine the surface finish of the outer edges 46, the thickness of each bead 41 adjacent to the outer edge 45 is adjusted. Then, at a predetermined distance inside of the outer edge 45, the thickness of each bead 41 is re-adjusted, forming one or more steps 44. This may be necessary to reduce the total number of beads 41 (and layers) required to fabricate the object 40 and/or to increase the contact surface area between beads 41, thereby providing a sufficient mechanical bond between beads 41.

Figure 5:
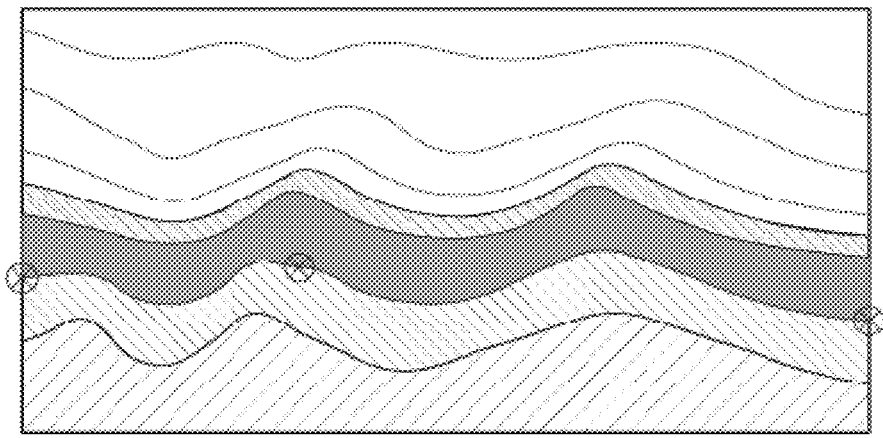
FIG. 5 is a cross-section detail of a further alternative object.

FIG. 5 is a cross-section of a further alternative object 50 fabricated with the apparatus 10, 20 shown in FIG. 1 or FIG. 2. The object 50 comprises a plurality of non-uniform thickness beads 51 arranged in a stack of generally non-planar layers. Each bead 51 has a non-regular undulating top surface 52 and/or bottom surface 53, with adjacent beads 51 having complementary mating top surfaces 52 and bottom surfaces 53 to provide a secure adhesion between the beads 51. Each bead 51 has a continuously varying thickness and defines at least two different cross-sections, whereby the thickness of the bead 51 between the two cross-sections varies along a gradient. The gradient may be linear or non-linear, thereby, in cross-section, forming a straight or curved profile between the cross-sections, respectively.

The object 50 may be fabricated by the apparatus 10 depositing the material at a constant flow rate whilst simultaneously varying the velocity of the deposition head 14 across the base surface 12, and moving the deposition head 14 perpendicular to the base surface 12. By adjusting the distance between the deposition head 14 and the base surface 12, the distance between the top surface 52 of the bead 51 and the base surface 12 (or a previously fabricated bead 51) is adjusted. Further, by varying the speed the material activation head 14 is moving parallel to the base surface 12, whilst depositing material at a constant rate, the volume of the subsequently fabricated portion of bead 51 is adjusted. Performing both of these actions simultaneously results in the thickness of the bead 51 being adjusted whilst the width of the bead 51 is maintained relatively constant.

Figure 6:
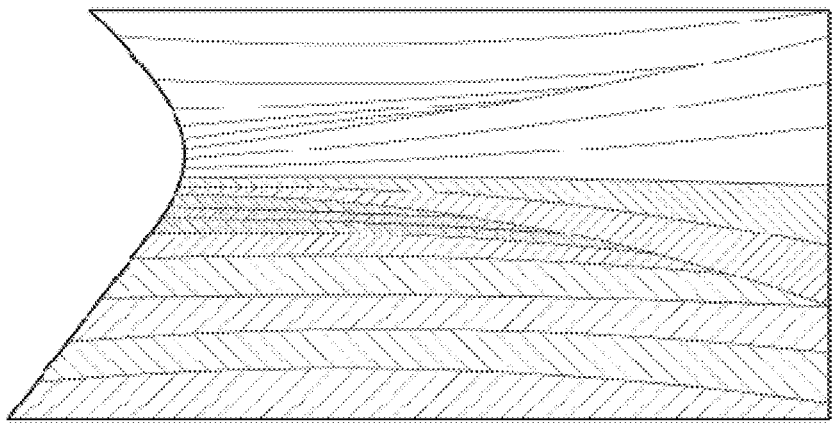
FIG. 6 is a cross-section detail of a further alternative object.

FIG. 6 is a cross-section of a further alternative object 60 fabricated with the apparatus 10, 20 shown in FIG. 1 or FIG. 2. The object 60 is formed from a plurality of non-uniform thickness beads 61, arranged in a stack of generally non-planar layers. Similar to the object 40 shown in FIG. 4, the thickness dimension of each bead 61 at an outer edge 62 of the object 60 is adjusted to fall within a tolerance window, thereby optimising the surface finish of the object 60. The thickness of each bead 61 is then varied inboard of the outer edge 62, forming a plurality of interlocked beads 61.

Figure 7:
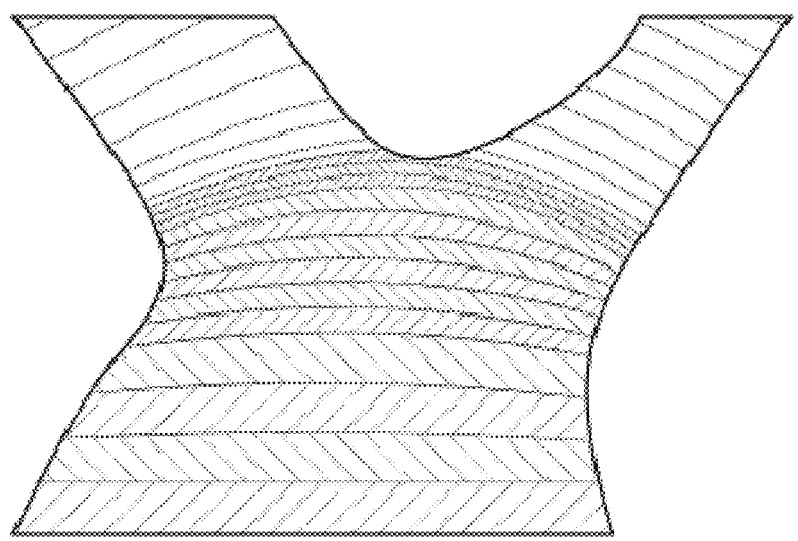
FIG. 7 is a cross-section detail of a further alternative object.

FIG. 7 is a cross-section of another object 70 fabricated with the apparatus 10, 20 shown in FIG. 1 or FIG. 2. The object 70 comprises a plurality of substantially non-planar, non-uniform thickness beads 71, which form a trunk section 72 joined to two branch sections 73. The thickness of the beads 71 progressively increases towards a centre of the trunk section 72 as the trunk 72 extends upwards, in order to position the beads 71 in the branch sections 73 substantially perpendicular across each branch 73. This demonstrates how varying the thickness of beads 71 allows each bead 71 to be arranged relatively perpendicular to a local external surface of the object 70, even when the object 70 has complex, non-regular geometry.

Figure 8:
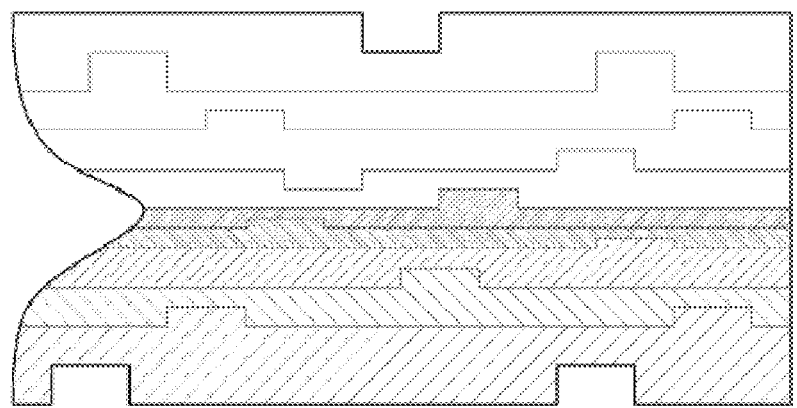
FIG. 8 is a cross-section detail of a further alternative object.

FIG. 8 shows a cross-section of a further alternative object 80 fabricated with the apparatus 10, 20 shown in FIG. 1 or FIG. 2. The object 80 comprises a plurality of non-uniform thickness beads 81 arranged in generally planar layers. Each of the beads 81 has one or more locally thickened portions forming projections 82 extending therefrom. Each of the beads 81 also have respective one or more locally thinned portions forming recesses 83, whereby at least some of the recesses 83 are dimensioned to at least partially receive the protrusion 82 extending from an adjacent bead 81. This arrangement of protrusions 82 and recesses 83 interlocks adjacent beads 82 together, thereby enhancing the bond between the beads 81.

Figure 9:
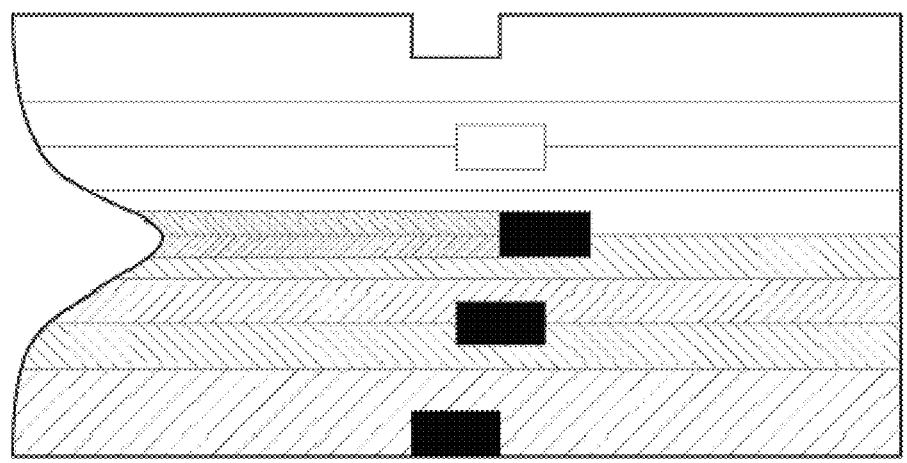
FIG. 9 is a cross-section detail of a further alternative object.

FIG. 9 shows a cross-section of another object 90 fabricated with the apparatus 10, 20 shown in FIG. 1 or FIG. 2. The object 90 comprises a plurality of non-uniform thickness beads 91 similar to the beads 81 of the object 80 shown in FIG. 8, also having recesses 92 formed therein. A cross-laminar portion 93 is inserted into each recess 92 during the fabrication process, the cross-laminar portion 93 arranged perpendicular to the elongate direction of the bead 91. For example, the beads 92 are typically fabricated by the apparatus 10, 20 in a 'y' (left-right) direction. The cross-laminar portion 93 is therefore arranged in an 'x' (away from the page) direction. The cross-laminar portion 93 may comprise additional material fabricated by the apparatus 10, 20 or alternatively, be a pre-fabricated structure inserted into the object 90, such as 'rebar' or a fibre optic sensor. The cross-lamination of the object 90 structure in this way can enhance the rigidity of the structure and enhance the delamination resistance of the object 90.

Each of the objects 30, 40, 50, 60, 70, 80, 90 described above may be fabricated by the apparatus 10, 20 from a non-uniform density material, whereby the apparatus 10, 20 is adapted to selectively vary the density of the material. For example, the deposition head 14 may include a nozzle in communication with a supply of gas and be adapted to selectively foam the material prior to or during fabrication. The amount of gas added to the material affects the density of a subsequently deposited portion of a bead, allowing the density of specific regions of the bead to be adjusted. Similarly, the apparatus 10, 20 may further comprise a nozzle in communication with a supply of reinforcement fibres and selectively add the fibres to the material prior to or during deposition, allowing the density and/or rigidity of specific regions of the fabricated material to be adjusted.

Also, each of the objects 30, 40, 50, 60, 70, 80, 90 described above may be fabricated by the apparatus 10 from a compound material, formed from two or more constituent materials mixed prior to or during fabrication. For example, the deposition head 14 may be in communication with different materials and be adapted to mix the materials during the fabrication process. This therefore allows the properties of specific portions of fabricated material to be adjusted, such as colour, texture, thermal insulation, sound insulation and/or electrical conductance. Alternatively, the deposition head 14 may be in communication with different materials and be adapted to deposit the different materials simultaneously side-by-side, thereby allowing the different materials to bond and form a co-laminated bead.

The geometry of the at least one bead 31, 41, 51, 61, 71, 81, 91 and the layers which the at least one bead 31, 41, 51, 61, 71, 81, 91 form may be calculated by an algorithm executing a two stage process, as described in further detail with reference to FIGS. 10 and 11 below, in order to generate the bead geometry.

In the first stage of the process, the algorithm evaluates the geometry of the computer model of the object and divides the model into a plurality of cross-sectional layers, where the geometry of each layer is arranged to be generally perpendicular to local external surfaces of the computer model which abut the layer. Each layer is then sub-divided into a plurality of beads, or a continuous bead.

For example, where the external surfaces of the model are generally vertical and planar, such as the model of the object 30 shown in FIG. 3, the model is divided into a plurality of horizontal, planar layers. Alternatively, where the external surfaces of the model are generally curved, such as the model of the object 70 shown in FIG. 7, the model is divided into a plurality of curved, non-planar layers.

Figure 10:
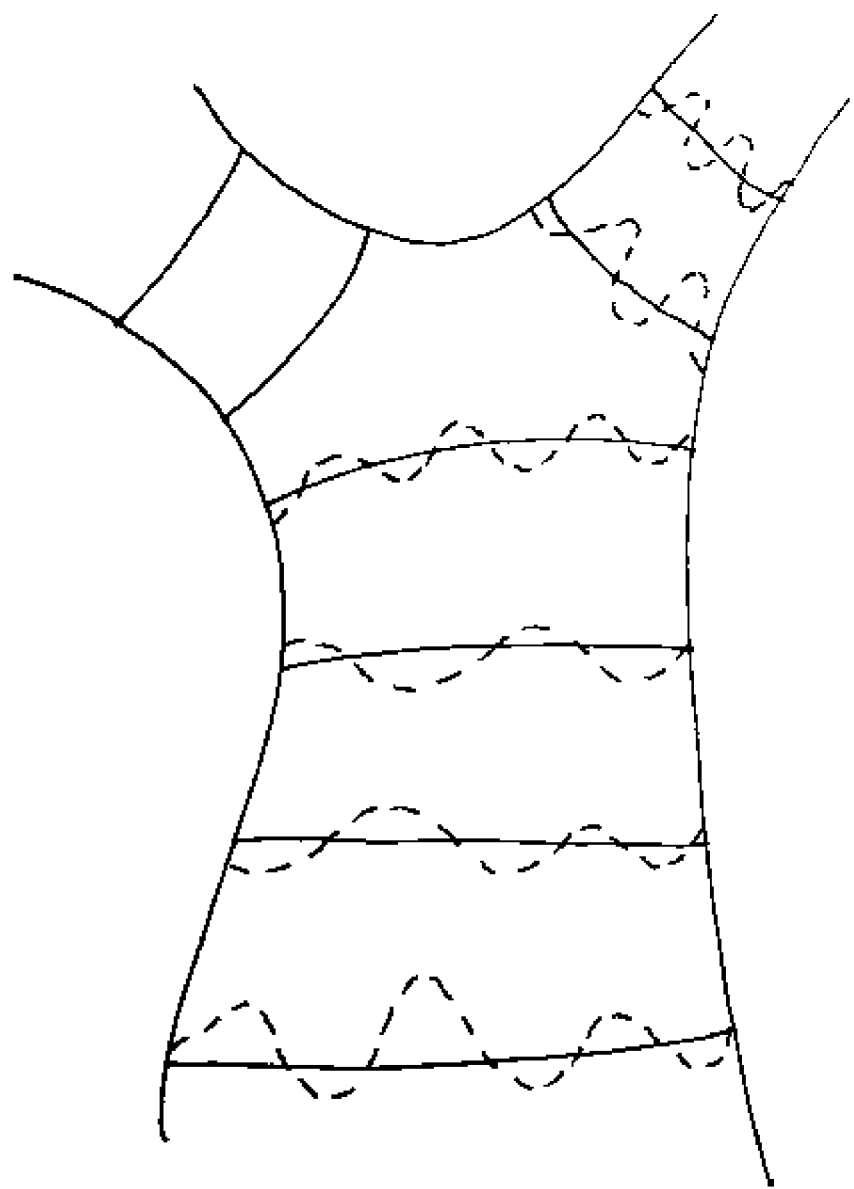
FIG. 10 is a cross-section detail of a computer model.

FIG. 10 further illustrates the first stage, showing the division of a computer model 100 into layers 102. The computer model 100 has generally curved external surfaces 101 and is divided into a plurality of layers 102 arranged substantially perpendicular to local external surfaces 101 enclosing each layer 102.

In the second stage of the process, the algorithm applies a wave generator to a boundary portion arranged across a junction of adjacent layers. This generates the geometry of the boundary portion corresponding with a waveform generated by the wave generator. Referring to FIG. 10, the wave generator generates a waveform 104 across a boundary portion 103 between adjacent layers 102, where the wave 104 has a constant wavelength, amplitude and frequency. This determines the geometry of mating surfaces of the adjacent layers 102, which are within the boundary portion 103, as complementary undulating surfaces corresponding with the waveform 104. It will be appreciated that the waveform 104 is merely an example of the many different waves that may be generated by the wave generator. For example, the wave generator may generate non-regular waves, such as embodied in beads 51, or waves having rectilinear form, such as embodied in beads 81. Similarly, the wave generator may generate waves extending in three dimensions, thereby forming double-curved mating surfaces at a boundary portion. Furthermore, it will be appreciated that the waveform generator may be configured to generate other non-wave geometries, such as faceted surfaces, triangular spikes or rectangular protrusions.

Figure 11:
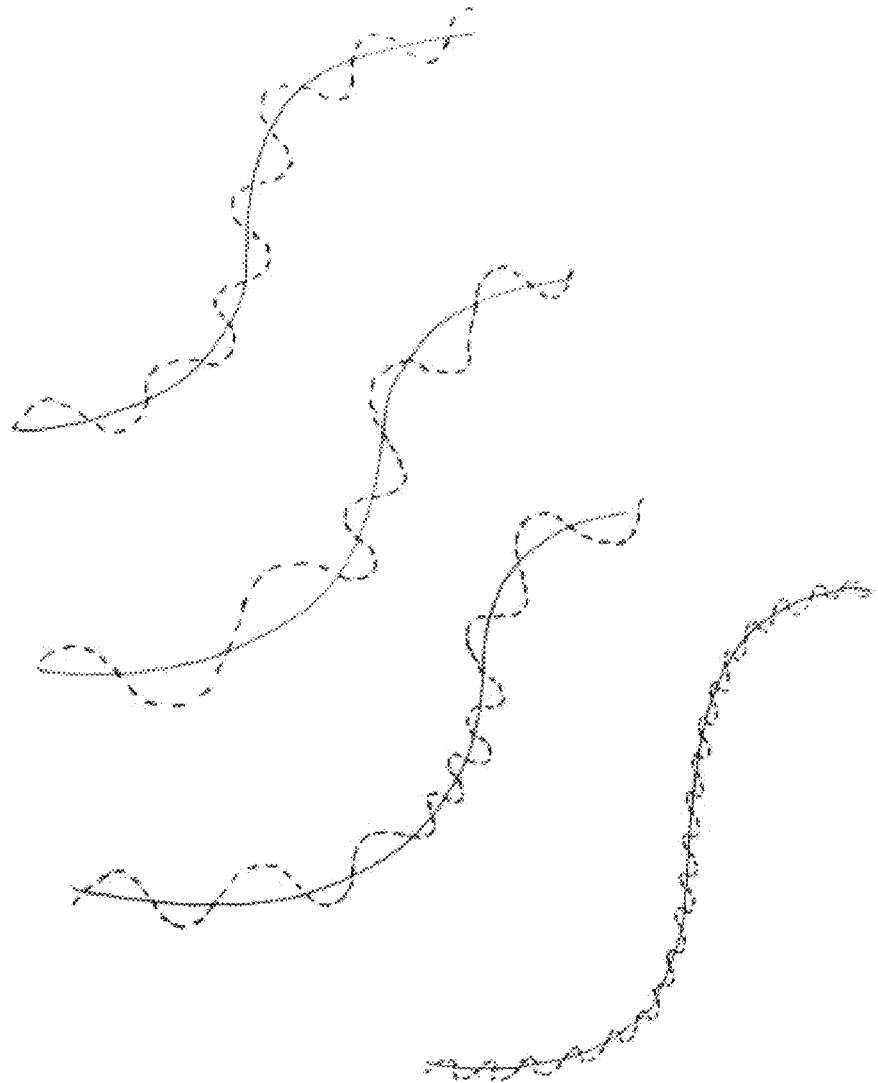
FIG. 11 shows four waveforms generated by a wave generator.

FIG. 11 shows four examples of various waveforms 111, 112, 113, 114 generated by the wave generator. Wave 111 is an example of a 'regular' wave, having a relatively constant wavelength, amplitude and frequency. Wave 112 is a non-regular or 'random' wave, having an inconsistent wavelength, amplitude and/or frequency. Wave 113 is a specifically varied non-regular wave, having a portion 115 reduced in amplitude and frequency to form substantially vertical wavelets which enhance adhesion between adjacent layers. Wave 114 is formed from angled wavelets, thereby forming a 'saw tooth' pattern, which also enhances adhesion between layers.

Alternatively, the second stage of the process may involve the algorithm adding steps within each boundary portion according to one or more defined criteria, such as step frequency/spacing, step height (potentially relative to layer thickness) or step sequence position, for example, the steps may be arranged offset from one another across adjacent layers progressively in a specified direction until a defined limit is reached, at which point the arrangement reverses or repeats.

For example, referring to FIG. 3, there is a step at the junction of portion 35 and portion 34. The step in the adjacent bead 31 is offset to the left of this step and reaches a defined limit geometric limit (not shown). The step in the next adjacent layer 31 is offset in the opposite direction, to the right of the previous step, and the step in the next adjacent layer 31 is offset to the right again. This arrangement of step sequence forms a 'zig-zag' extending vertically upwards through layers of beads 31.

FIGS. 12A-12D show an alternative aspect of the apparatus 10, where the deposition head 14 includes a plurality of nozzles 121 in communication with the material and adapted to expel the material therefrom, each of the nozzles 121 being movable in at least one direction and rotatable about at least one axis, relative to the deposition head 14.

Figure 12A:
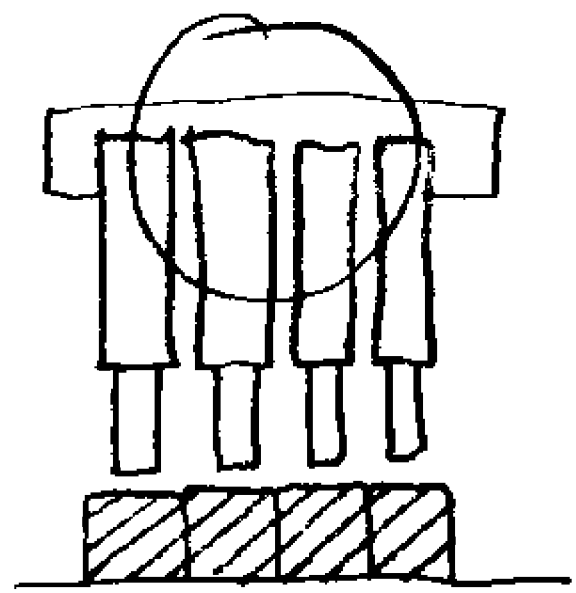
FIGS. 12A to 12D show an alternative aspect of the apparatus shown in FIG. 1.
Figure 12B:
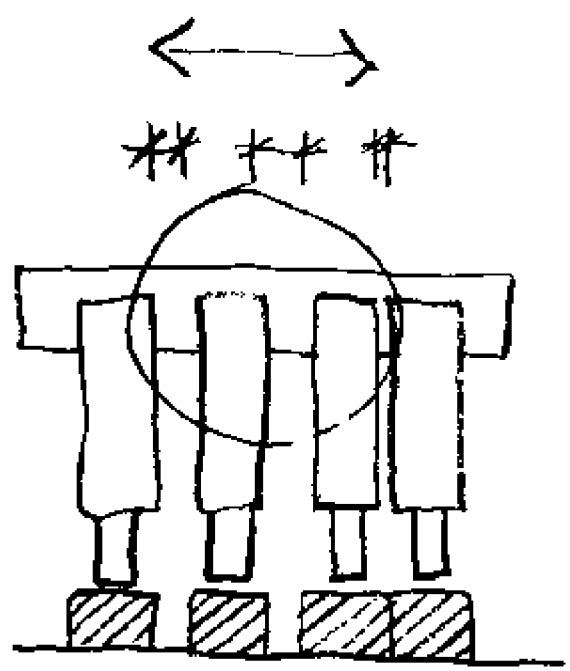

FIG. 12B shows some of the nozzles 121 displaced laterally across the deposition head 14 consequently forming a space 124 between beads 123 deposited therebelow.

Figure 12C:
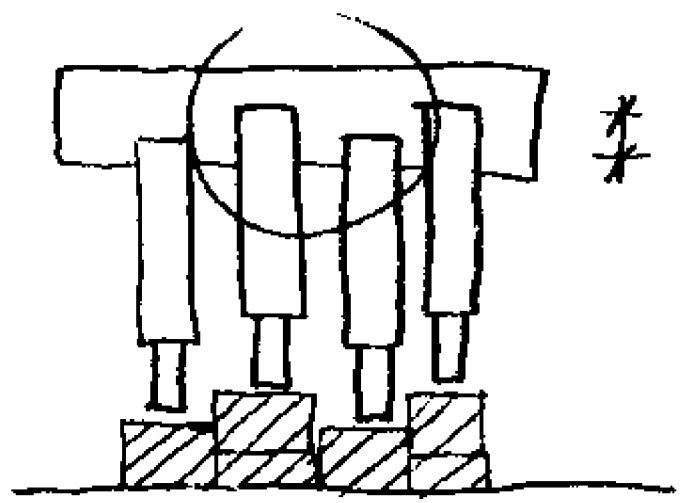

FIG. 12C shows some of the nozzles 121 displaced vertically across the deposition head 14, thereby adjusting the distance between those nozzles 121 and the support surface 12. Where the flow rate of the material deposited from the displaced nozzles 121 is increased, this allows the thickness of the bead 125 to be increased. Similarly, the position of the displaced nozzles 121 allows the nozzles 121 to fabricate a bead 125 upon a previously fabricated bead 126. In either case, the vertical displacement of nozzles 121 allows a stepped formation of beads to be fabricated simultaneously to form a coherent, non-uniform thickness bead 127.

Figure 12D:
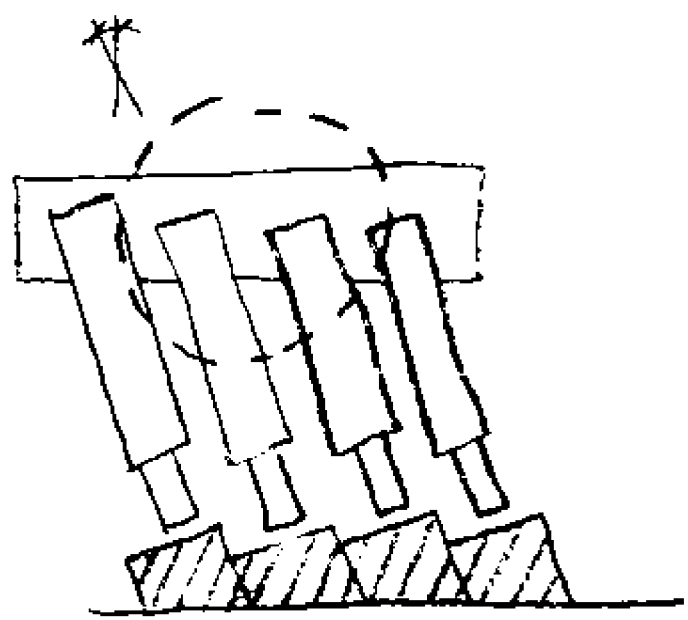

FIG. 12D shows all of the nozzles 121 rotated relative to the deposition head 14, thereby adjusting the orientation of each nozzle 121 and consequently adjusting the orientation of each bead 128 deposited by the nozzles 121. The rotation of the nozzles 121 allows an alternative stepped formation of beads to be fabricated, where each bead 128 in the formation is formed at an angle to the support surface 12 to form an alternative coherent, non-uniform thickness bead 129.

FIGS. 13A-13E show various beads 131, 135, 140, 145 fabricated with the deposition head 14 shown in FIGS. 12A to 12D.

Figure 13A:
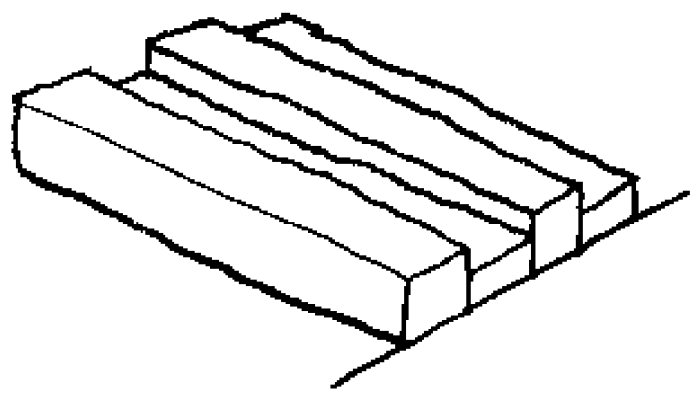
FIGS. 13A to 14D show various objects fabricated by the apparatus shown in FIGS. 12A to 12D.

FIG. 13A shows a composite bead 131 formed from four beads 132, 133 deposited by the four nozzles 121 arranged as shown in FIG. 12C.

Figure 13B:
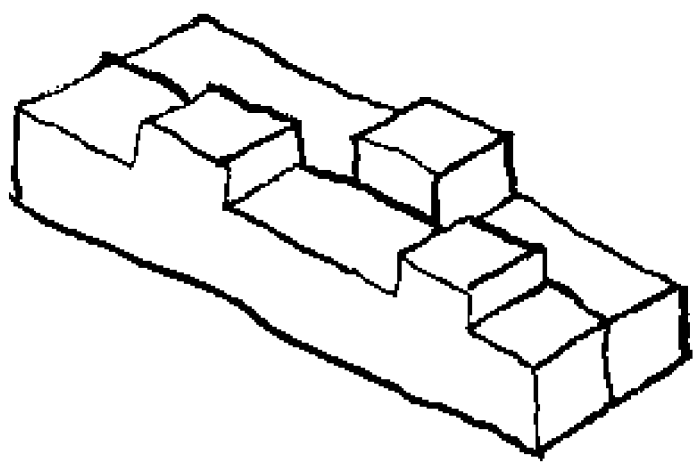

FIG. 13B shows an alternative composite bead 135 formed from two beads 136, 137 deposited by two of the nozzles 121. As the deposition head 14 is moved across the support surface 12, the nozzles 121 are selectively moved towards and away from the support surface 12 whilst simultaneously increasing or decreasing the flow rate of the material being deposited, thereby fabricating the two beads 136, 137 having projections 138 extending therefrom, away from the surface 12. It will however be appreciated that it is not necessary for the deposition head 14 to have multiple nozzles 121 to fabricate the composite bead 135 and instead, the composite bead 135 may be fabricated by an alternative embodiment of the deposition head 14 having a single nozzle 121, where the apparatus 10 executes two deposition actions to fabricate the two beads 136, 137.

Figure 13C:
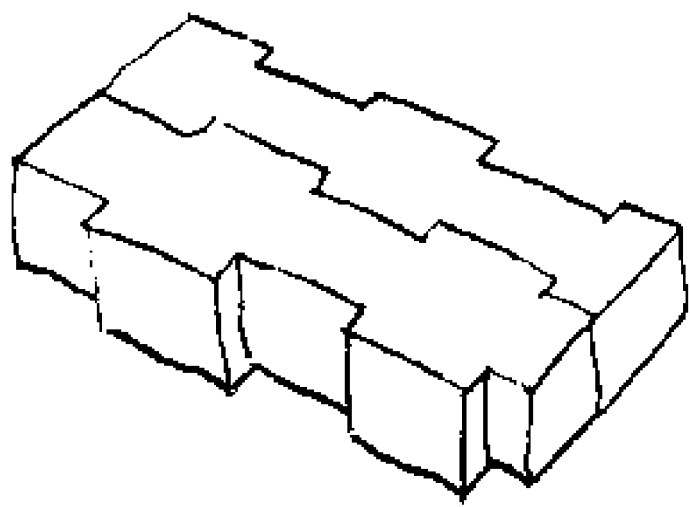

FIG. 13C shows a composite bead 140 formed from two beads 141, 142 deposited by two of the nozzles 121. As the deposition head 14 moves across the support surface 12, the distance between each nozzle 121 and the support surface 12 is maintained at a constant whilst adjusting the flow rate of the material being deposited by the nozzles 121, whereby when the flow rate of a first nozzle 121 is increased, the flow rate of a second nozzle 121 is decreased. This fabricates two beads 141, 142 having variable width, each bead 141, 142 having a plurality of complementary projections 143 extending across the surface 12, fabricated by increasing the flow rate, and recesses 144 dimensioned to receive the projections 143, fabricated by decreasing the flow rate, thereby interlocking the beads 141, 142 together.

Figure 13D:
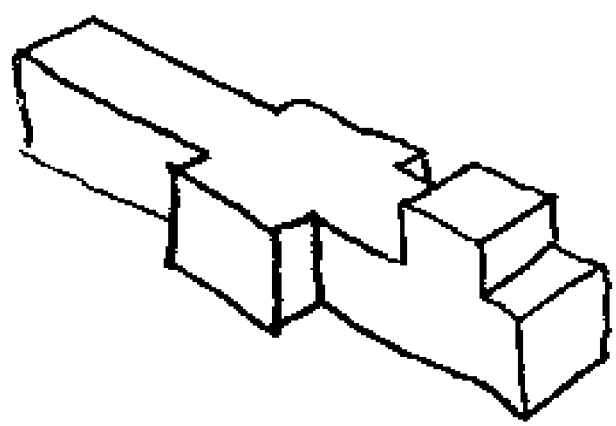

FIG. 13D shows a bead 145 fabricated by a combination of the approaches described above. The bead 145 includes a first, widened portion comprising a projection 146 extending in a horizontal direction, and a second, thickened portion, comprising a projection 147 extending in a vertical direction.

Figure 13E:
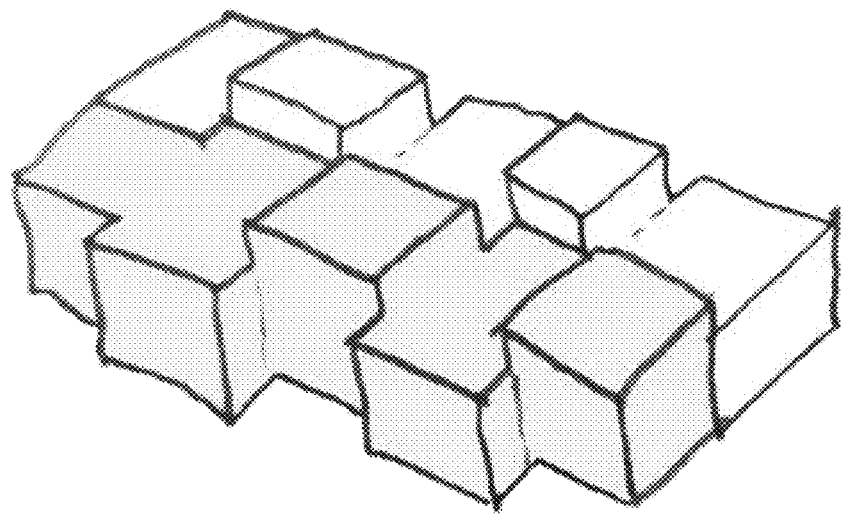

FIG. 13E shows a composite bead 150 formed from two beads 151, 152 deposited by two of the nozzles 121. Each bead 151, 152 is a variation of the bead 145 and has been fabricated in the same way, forming projections 153, 154 extending in different directions from the beads 151, 152, thereby interlocking the beads 151, 152 together.

Figure 14A:
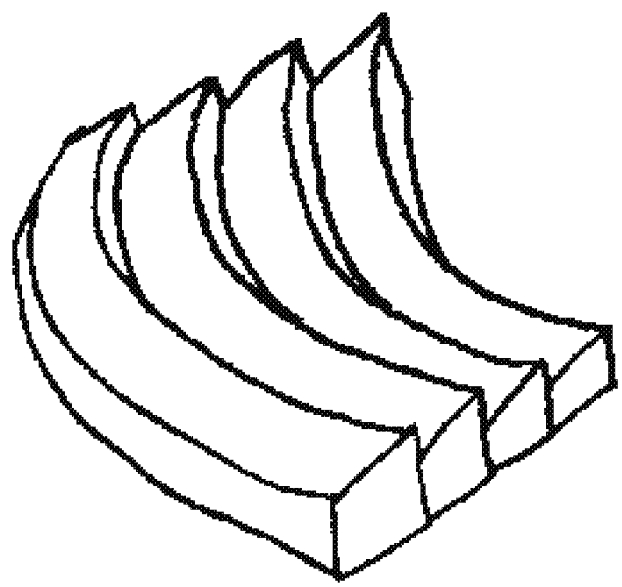

FIG. 14A shows a composite bead 155 formed from four beads 156 deposited by the four nozzles 121 arranged as shown in FIG. 12D. The deposition head 14 has moved across the support surface 12 along a curved path whilst depositing material from each nozzle 121 simultaneously, thereby fabricating the four beads 156 to form an interleaved formation.

Figure 14B:
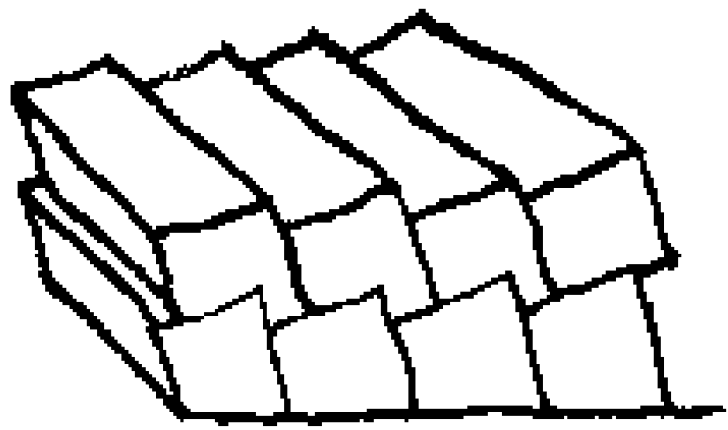
Figure 14C:
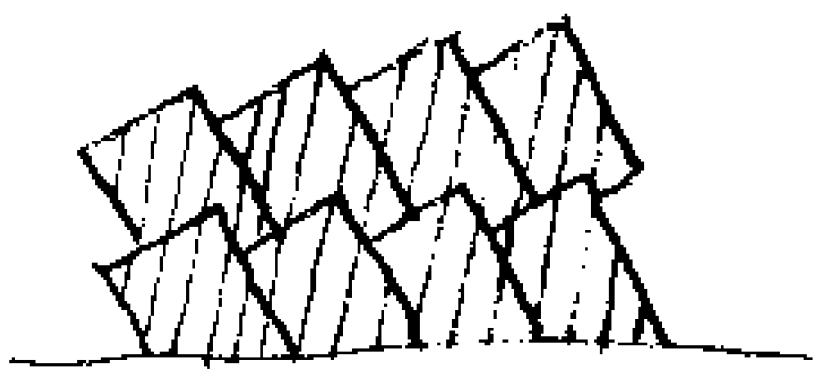

FIGS. 14B and 14C show an object 160 fabricated in the same way as the composite bead 155 shown in FIG. 14A, except the deposition head 14 has moved along a straight path whilst depositing material from each nozzle 121 simultaneously. The object 160 comprises two layers of composite beads 161, 162. FIG. 14C shows an end view of object 160, illustrating the interleaved arrangement of the beads 161, 162.

Figure 14D:
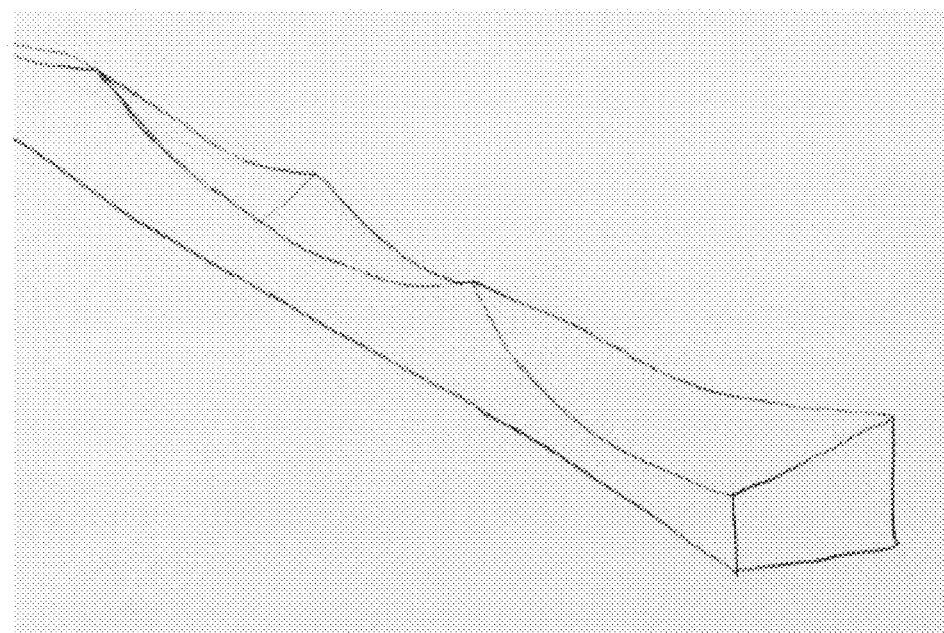

FIG. 14D shows a bead 165 of the material fabricated by one of the nozzles 121 being oscillated about an axis whilst depositing the bead 165 along a straight path. The oscillation of the nozzle 121 has caused a top surface 166 of the bead 165 to form a complementary oscillating, double-curved geometry.

Figure 15A:
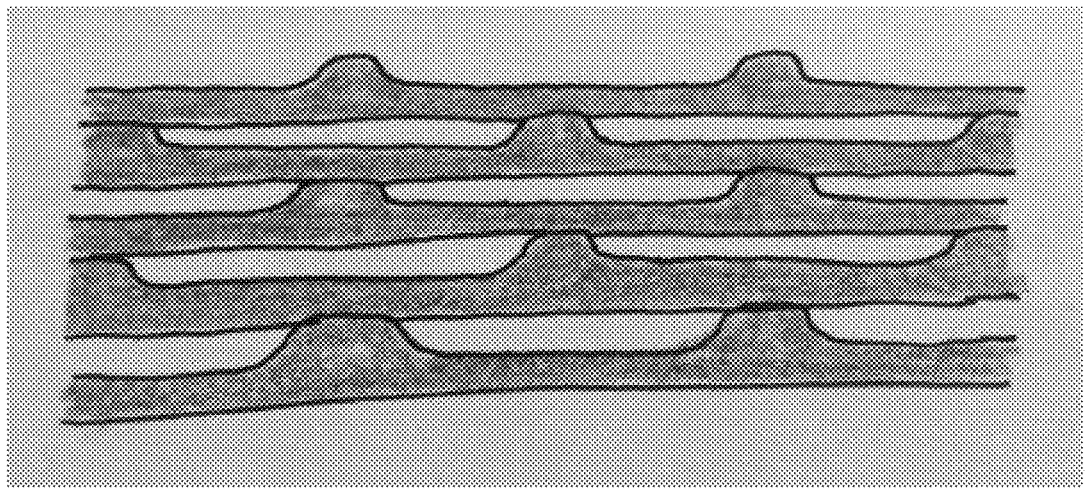
FIGS. 15A to 16B are cross-section details of a further alternative object.
Figure 15B:
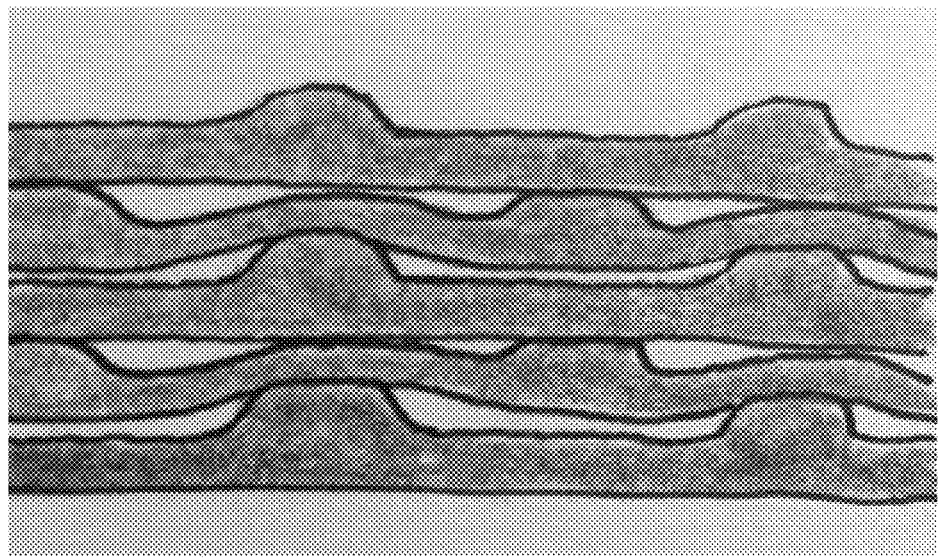

FIGS. 15A and 15B show a cross-section of an alternative object 170 fabricated by the apparatus 10, 20 shown in FIG. 1 or FIG. 2. The object 170 comprises a plurality of layers arranged on top of one another, each layer formed from one or more beads 171 of material. Each bead 171 has two or more thickened portions, being projections 172 which extend vertically away from the bead 171.

Where the object 170 is fabricated by the deposition apparatus 10, the material which forms the beads 171 is a self-supporting material, able to form unsupported spans between distal locations. For example, the material may harden very rapidly after being deposited by the apparatus 10 and be sufficiently strong to support its own weight. Alternatively, the material may have a high surface tension and be able to stretched between the distal locations and attached therebetween without drooping. Further alternatively, the material may be deposited into a volume of fluid-like support material (not shown), such as a reservoir filled with a liquid support material, to support the beads 171 and particularly the spans, during the fabrication process.

Where the object 170 is fabricated by the selective solidification apparatus 20, the beads 171 are generally supported from below by the volume of curable material 23 contained in the reservoir 22 and therefore able to form spans between distal locations without drooping.

The beads 171 are fabricated on top of one another and span between projections 172, thereby forming cavities or voids 173 in the object 170. This is particularly useful if the object 170 will require cooling or heating during use, as a coolant or heated fluid can be passed through the cavities 173. This can also be useful if the object 170 will be deformed during use, such as being a resiliently flexible structure, or a plastically deformable structure, in order to absorb force.

In FIG. 15B, the material which forms the beads 171 is flexible and therefore is compressed into the cavities 174 when a subsequent bead 171 is fabricated thereover. Contact surfaces between projections 172 and beads 171 may have further variations fabricated therein, such as wavelet geometry as described above, in order to enhance adhesion between adjacent beads 171.

Figure 16A:
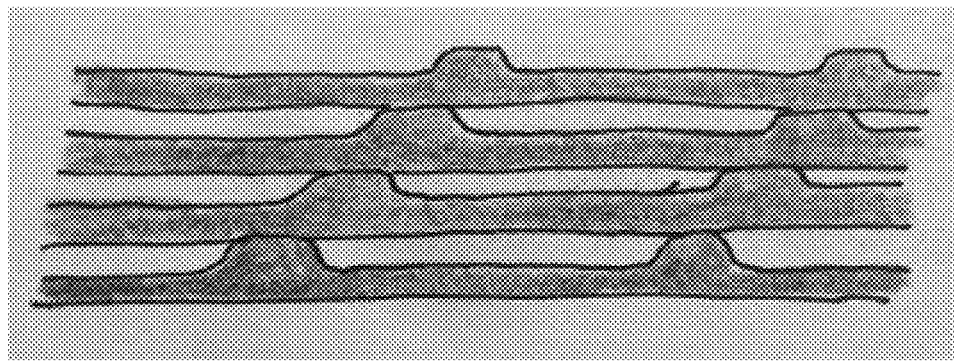

FIG. 16A shows a variation of the object 170 shown in FIG. 15A, where the projections 172 are arranged offset along the length of each bead 171 relative to the projections 172 extending from an adjacent bead 171. For example, a first bead 175 is fabricated having two projections 176 extending therefrom. A second bead 177 is then fabricated over the first bead 175 having two projections 178 extending therefrom and arranged spaced apart along the bead 177 relative to the previously fabricated projections 176. The offset arrangement of projections 176, 178 in this way allows the structure of the object 170 to be optimised for functional and/or aesthetic requirements. For example, the relative location of projections 176, 178 may transmit forces through the object 170 or guide fluid flowing through the object 170.

Figure 16B:
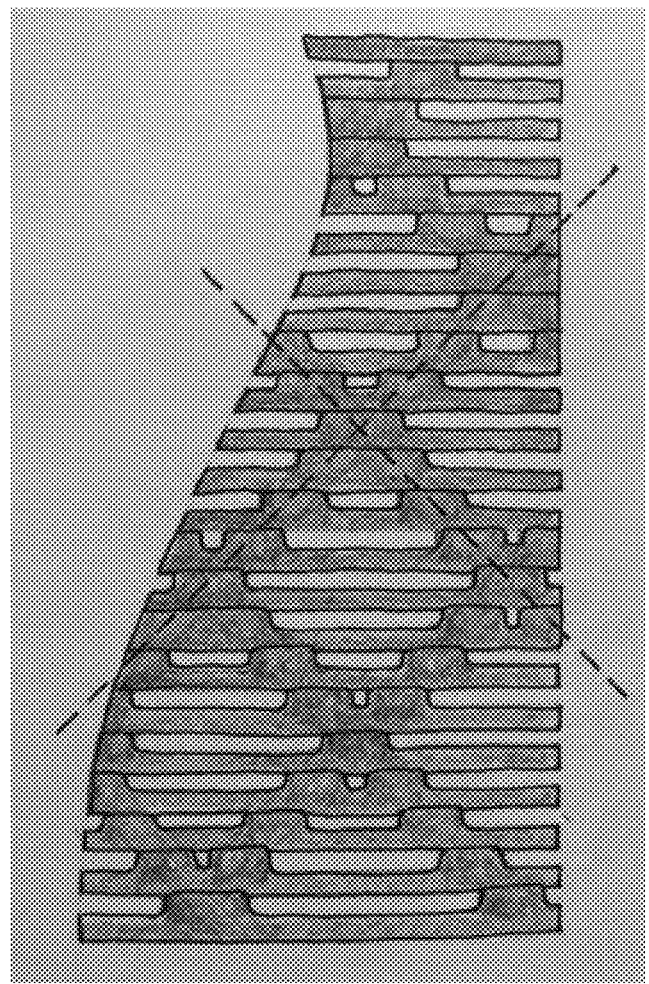

FIG. 16B shows a further variation of the object 170 shown in FIGS. 15A and 16A, where the projections 172 are arranged in a 'diagrid' (diagonal support structure), whereby the relative position of the projections 172 is optimised to support the weight of the object 170.

Figure 17:
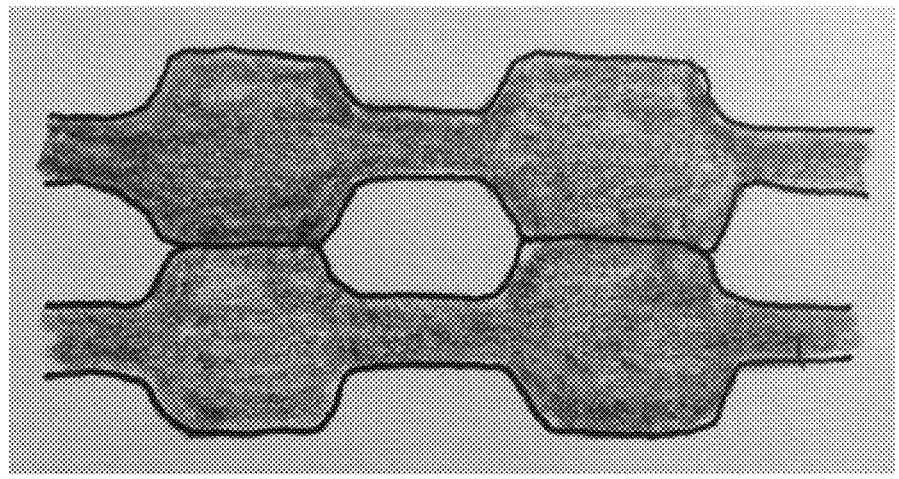
FIG. 17 is a cross-section detail of a further alternative object.

FIG. 17 shows a cross-section of an alternative object 180 fabricated by the apparatus 10, 20 shown in FIG. 1 or FIG. 2. The object 180 comprises at least two non-uniform thickness beads 181, each bead 181 having projections 182 extending from both sides of the bead 181. Between the projections 182, the bead 181 forms an unsupported web 183. Similar to the object 170, the thickened projections 180 joined by thinner webs 183 allows the object 180 to form an open structure which would be useful for passing fluid, light or other objects, such as services conduits, therethrough.

Figure 18:
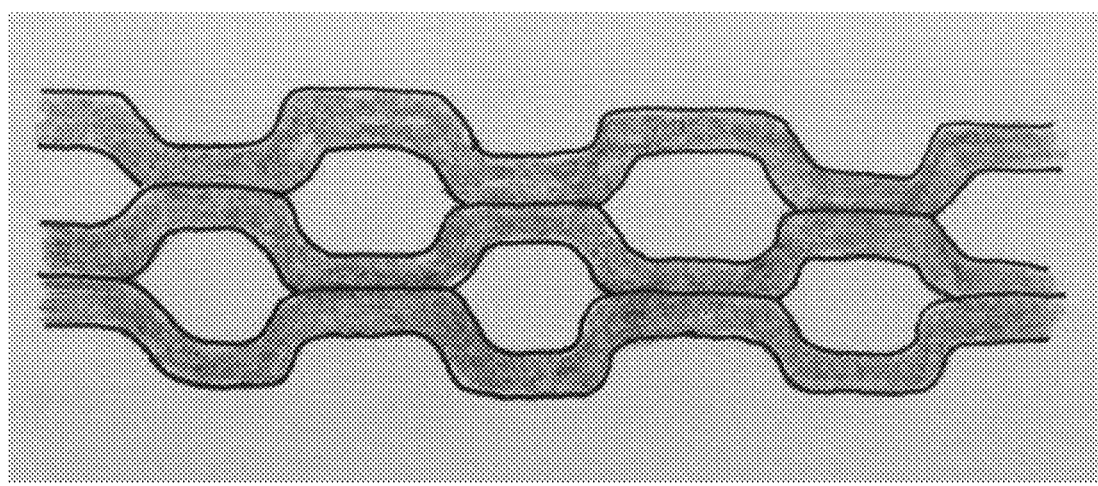
FIG. 18 is a cross-section detail of a further alternative object.

FIG. 18 shows a cross-section of a further alternative object 190 fabricated by the apparatus 10, 20 shown in FIG. 1 or FIG. 2. The object 190 comprises at least two non-uniform thickness beads 191, where each bead 191 is fabricated from a substantially constant thickness bead of self-supporting material which extends towards and away from a previously fabricated bead 191. The distance which the bead 191 extends towards and away from another bead 191 is typically varied whilst the bead 191 is being fabricated, thereby resulting in a net non-uniform thickness bead 191.

Figure 19:
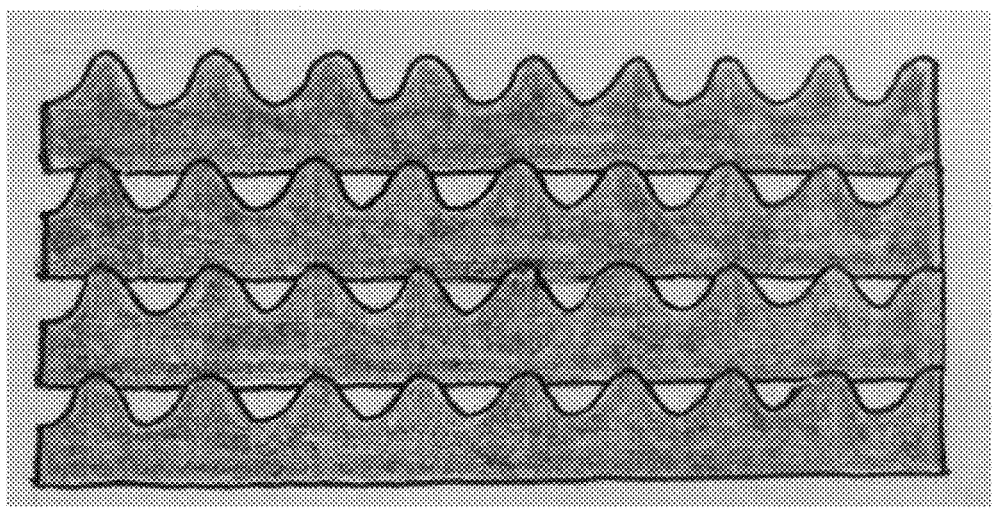
FIG. 19 is a cross-section detail of a further alternative object.

FIG. 19 shows a cross-section of a further alternative object 200 fabricated by the apparatus 10, 20 shown in FIG. 1 or FIG. 2. The object 200 comprises a plurality of substantially planar layers formed from at least one non-uniform thickness bead 201. Each bead 201 has at least one irregular and typically undulating surface 202 thereby varying the height of each bead 201. Where the bead 201 is fabricated by the deposition apparatus 10 this may be due to the rate of the material being deposited by the apparatus 10 being varied in pulses, thereby fabricating corresponding portions of increased material volume which form of peaks along a top surface of the bead 190.

Figure 20A:
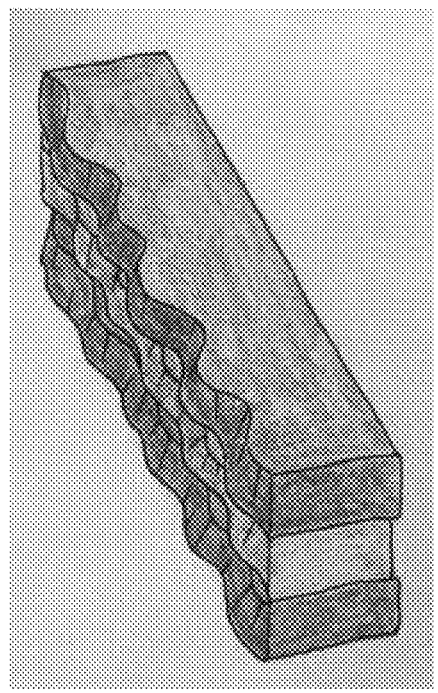
FIG. 20A is a sectioned perspective view of a further alternative object.

FIG. 20A is a variation of the object 200 where the beads 201 have an undulating side-wall 203 thereby varying the width of each bead 201. Where the bead 201 is fabricated by the deposition apparatus 10 this may be due to a planar guide surface (not shown) being arranged extending from the deposition head 14 and varying the deposition rate in pulses, causing deposited material to be pulsed from the deposition head 14 and be compressed between the guide surface and base surface 12, or a previously fabricated bead 201, to form the undulating side-wall 203. This therefore fabricates beads 201 having a relatively constant height and varied width.

Figure 20B:
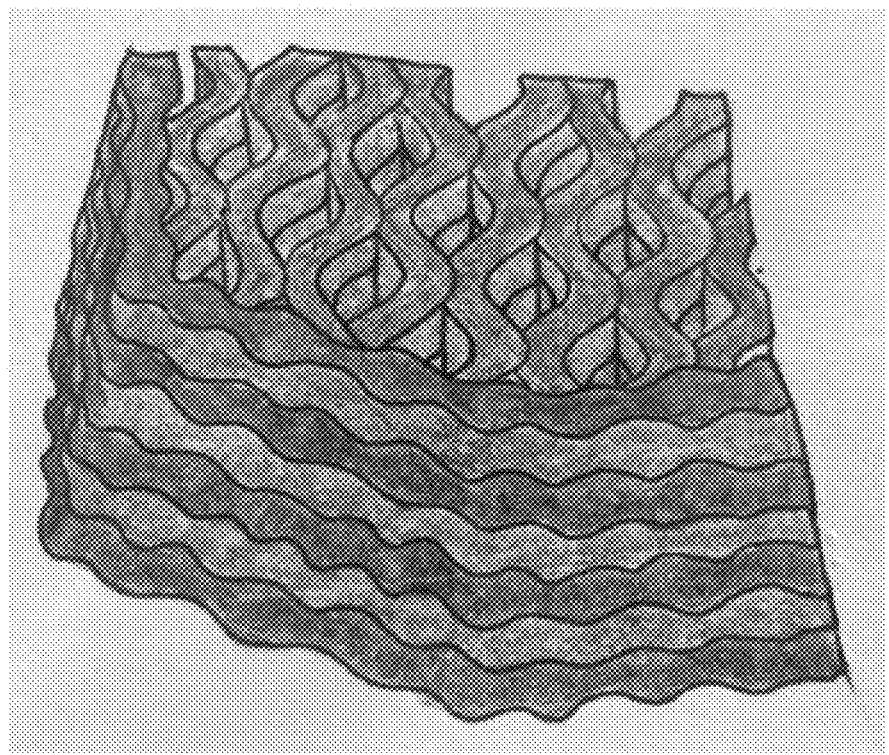
FIG. 20B is a sectioned perspective view of a further alternative object.

FIG. 20B is a further variation of object 200, where the beads 201 are fabricated having two opposed, undulating side-walls 204 to form a perimeter wall of the object 200. This can be useful if a rough surface finish is required, for example, for an aesthetic effect or providing a higher friction surface, such as to receive a smooth, finishing surface material.

Figure 21:
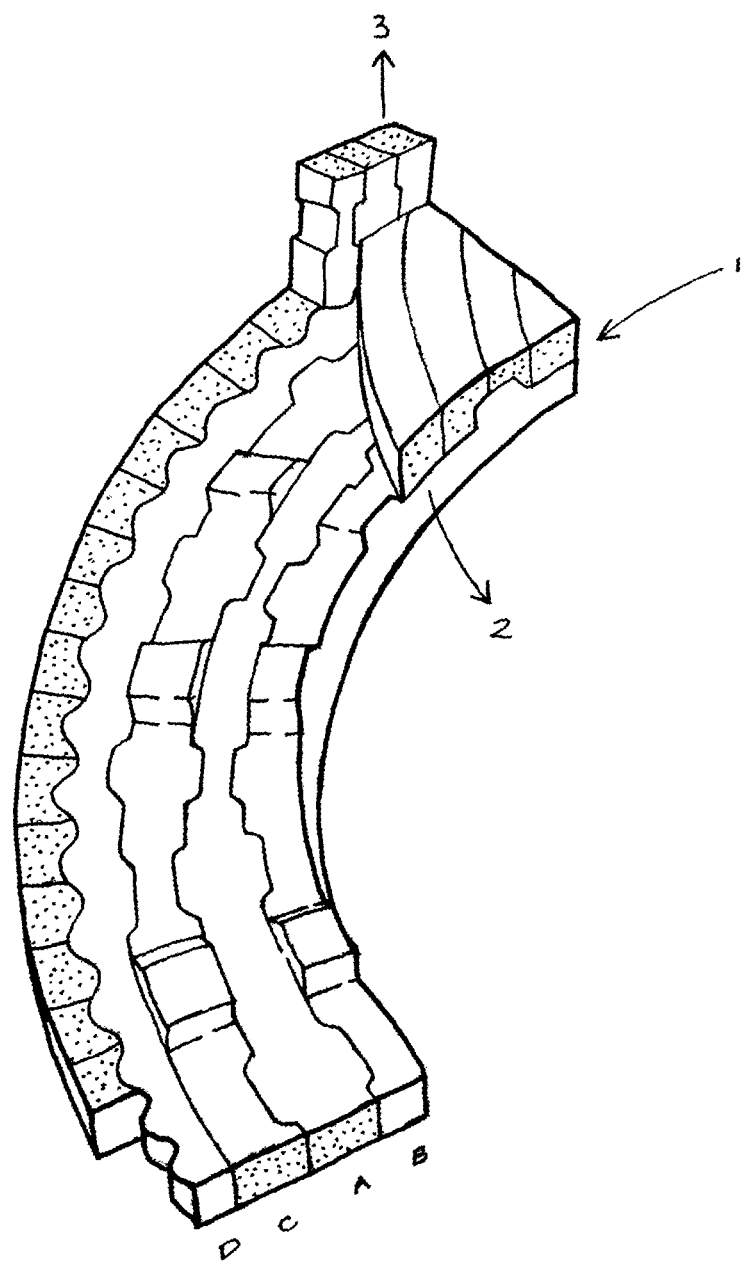
FIG. 21 is a sectioned perspective view of a further alternative object.

FIG. 21 shows an object 210 fabricated by the apparatus 10, 20 shown in FIG. 1 or 2, comprising a plurality of non-uniform thickness beads 213 215, 217 which are a variation of the beads 135, 140, 145, 150 shown in FIGS. 13B to 13E. The object 210 includes three layers 212, 214, 216. A base layer 212 comprises first beads 213 fabricated on a substantially horizontal first notional plane (not shown), a mid layer 214 comprises second beads 215 fabricated on a substantially horizontal second notional plane (not shown) arranged parallel to and spaced apart from the first notional plane, and an outer layer 216 comprises third beads 217 fabricated on a substantially vertical, curved third notional plane (not shown).

The first beads 213 have a plurality of thickened projections 2131 extending parallel and perpendicular to the first notional plane, and a plurality of recesses 2132 dimensioned to receive at least some of the projections 2131 of adjacent beads 213, thereby interlocking with the adjacent beads 213. The second beads 215 are fabricated overlaying the first beads 213 at an angle thereto and form a plurality of thin portions or recesses 2151 to receive the projections 2131 extending from the first beads, thereby cross-laminating across the first beads 213 and interlocking with the first beads 213. The third beads 217 extend upwards along an outer edge of the first beads 213 and second beads 215 and have mating projections 2171 and recesses 2172 to interlock like beads 217, and also have thickened portions 2173 dimensioned to interlock with an undulating side-wall 2133 of the first beads 213. The fabrication of non-uniform thickness beads 213, 215, 217 in this way advantageously allows an intricately interlocked, cross-laminated structure to be produced which can withstand a high level of forces and environmental conditions before delaminating.

Figure 22:
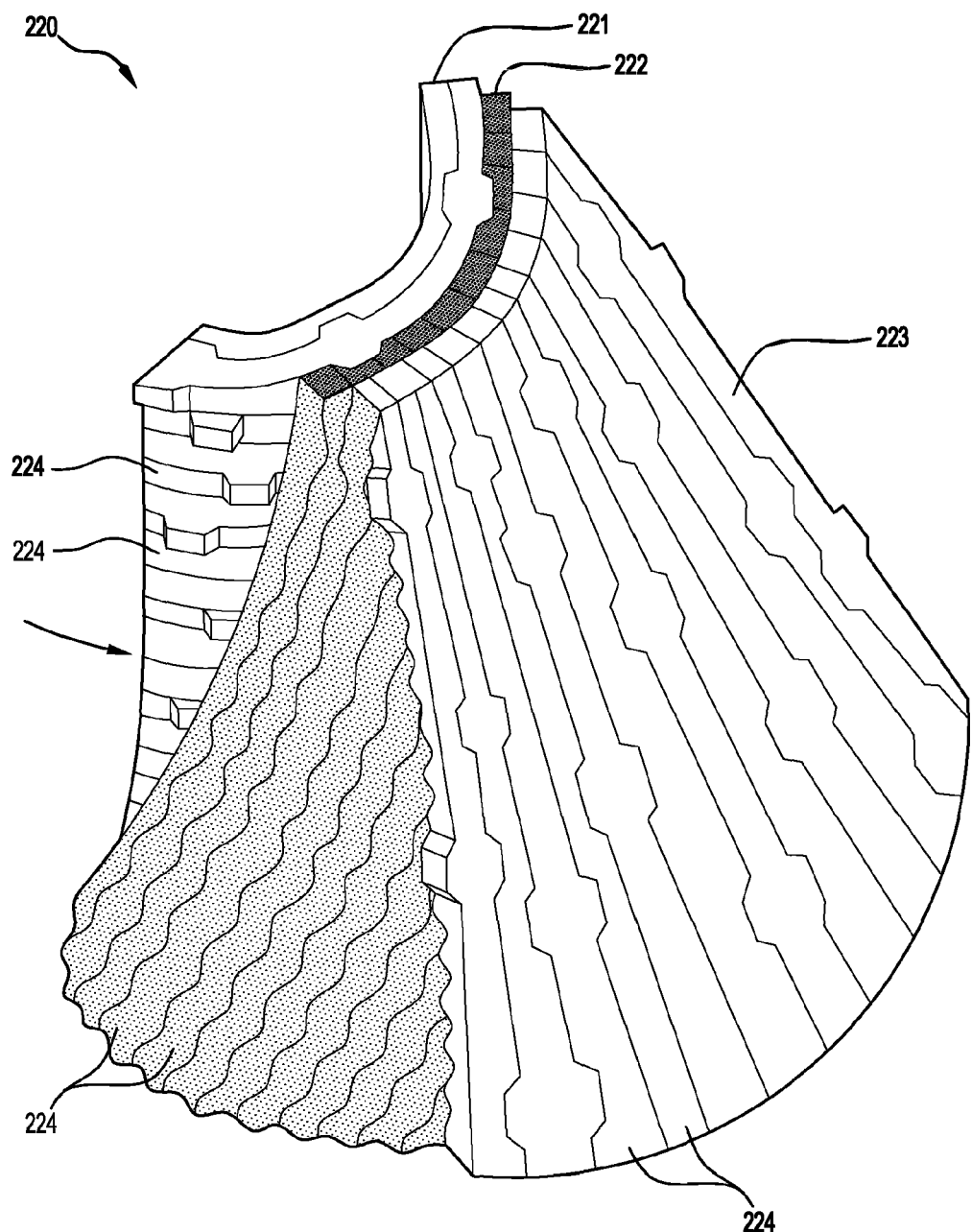
FIG. 22 is a sectioned perspective view of a further alternative object.

FIG. 22 shows an alternative object 220 which is a variation of the object 210 shown in FIG. 21. The object 220 comprises an inner layer 221, mid layer 222 and outer layer 223, each layer 221, 222, 223 formed from a plurality of non-uniform thickness beads 224. Each of the beads 224 have a plurality of thickened and/or thinned portions which vary the height and/or width of the bead 224, the portions dimensioned to interlock with other thickened or thinned portions in beads 224 in the same layer 221, 222, 223 and/or the adjacent layer 221, 222, 223. The beads 224 are also fabricated in different planes and/or in different directions in order to overlay multiple beads 224 in the adjacent layer 221, 222, 223 at an angle, thereby cross-laminating the layers 221, 222, 223.

Figure 23A:
FIGS. 23A to 23C are cross-section details of three stages of fabricating a further alternative object.
Figure 23B:
Figure 23C:

FIGS. 23A to 23C show three stages of fabricating a further alternative object 230, at least partially formed from non-uniform thickness beads 233, 235. FIG. 23A illustrates a first stage, where a plurality of first beads 231 are fabricated on a surface 239 and spaced apart from each other to define voids 232 therebetween. FIG. 23B illustrates a second stage, where second beads 233 are fabricated over the first beads 231, the second beads 233 extending across the voids 232 to adhere to two adjacent first beads 231 and at least partially penetrate into the voids 232, typically filling the voids 232. The second beads 233 define further voids 234 therebetween. FIG. 23C illustrates a third stage, where third beads 235 are fabricated over the second beads 236 to adhere to adjacent second beads 233 and at least partially fill the voids 234 between second beads 233. Fabricating the object 230 in this way therefore interlocks adjacent layers of beads 231, 233, 235 together, with the second beads 233 and third beads 235 forming a T-shaped cross-section.

Figure 24:
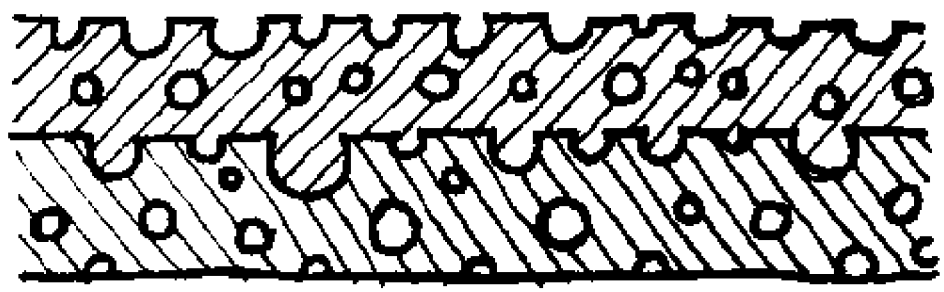
FIG. 24 is a cross-section detail of a further alternative object.

FIG. 24 shows a further alternative object 240 fabricated with the apparatus 10, 20 shown in FIG. 1 or FIG. 2. The object 240 comprises two layers formed from at least two respective non-uniform thickness beads 241, 242, each bead 241, 242 formed from a foamed material having a plurality of pits 243, created by bubbles of a gas expanding and popping. The foaming is typically caused by the apparatus 10, 20 selectively adding the gas to the material as each bead 241, 242 is fabricated. Alternatively, the foaming is caused by a chemical reaction occurring within the material forming the beads 241, 242 shortly after the material is fabricated. Optionally, the apparatus 1 may prompt the chemical reaction by selectively exposing the first material to energy and/or a chemical agent.

The foaming of the first material creates a plurality of indents 243 which, when the upper bead 242 is fabricated over the lower bead 241, cause the upper bead 242 to conform to and form complementary bulges 244 which extend into the indents 243, thereby interlocking the beads 241, 242 together. Similarly, the foaming may form bulges (not shown) which extend from the lower bead 241 and which the upper bead 242 confirms over and interlocks.

Figure 25:
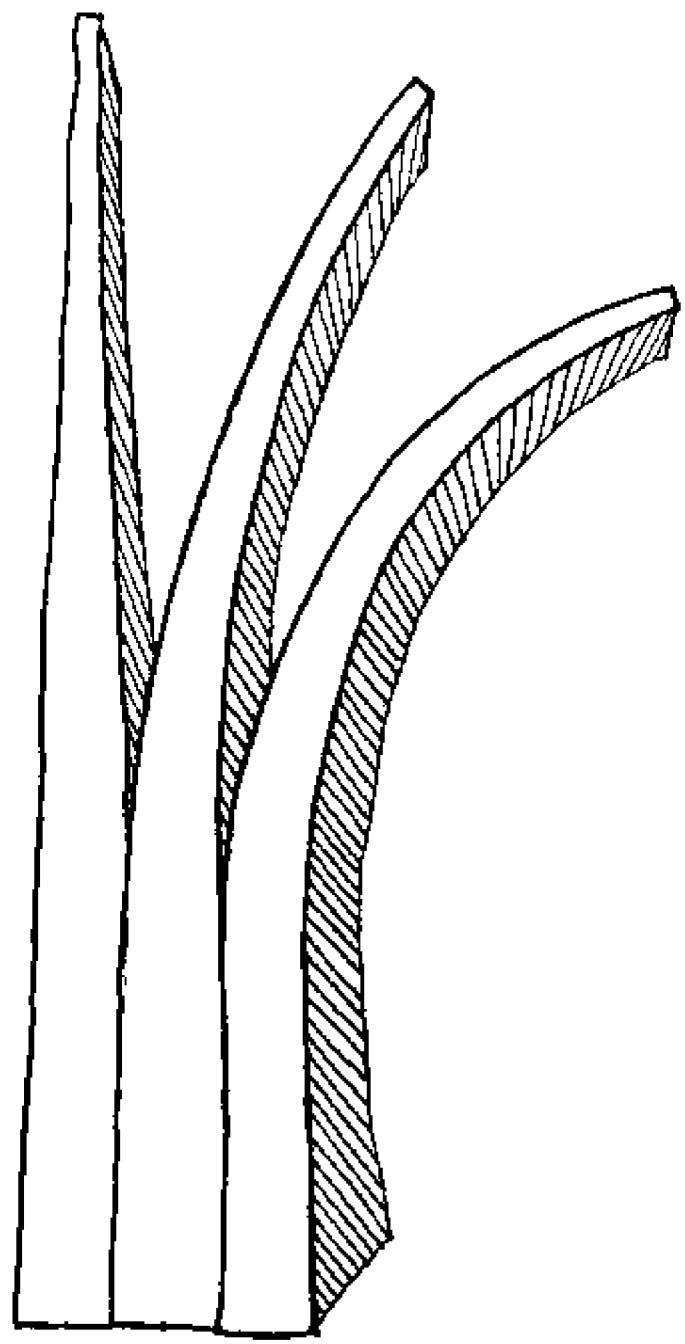
FIG. 25 is a perspective view of a further alternative object.

FIG. 25 shows a further alternative object 250 fabricated with the apparatus 10, 20 shown in FIG. 1 or FIG. 2. The object 250 comprises a plurality of tapering beads 251 formed from a self-supporting material and extending away from a surface 252.

Figure 26A:
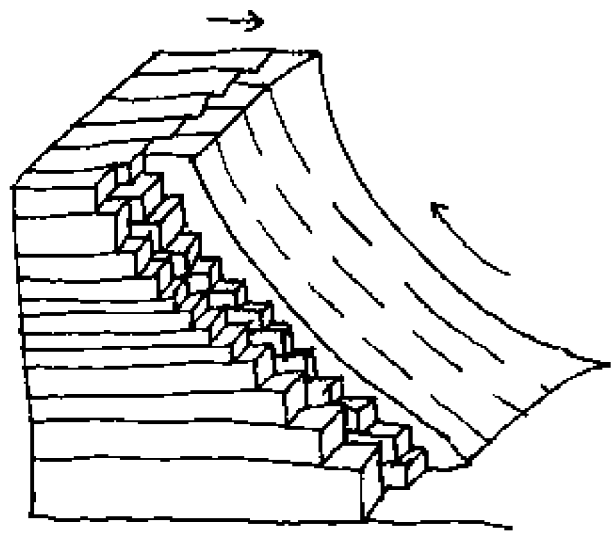
FIGS. 26A to 26C are perspective details of a further alternative object.
Figure 26B:
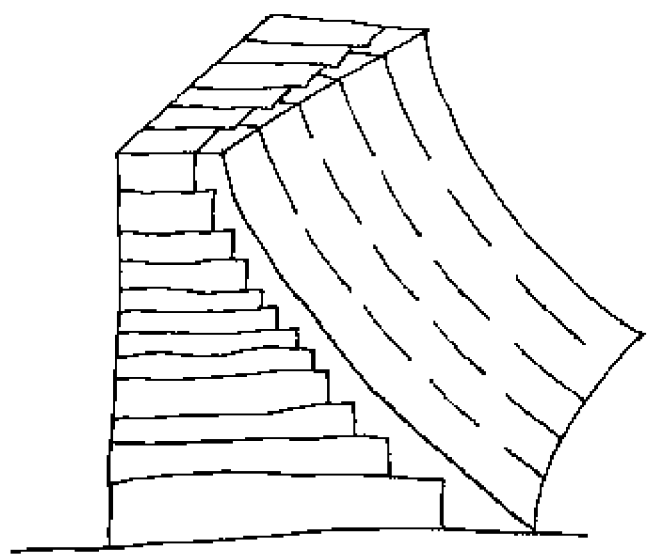

FIGS. 26A and 26B show a further alternative object 260 fabricated with the apparatus 10, 20 shown in FIG. 1 of FIG. 2. In FIG. 26A, the object 260 is partially fabricated and in FIG. 26B, the object 260 is complete. The object 260 comprises a plurality of core beads 261 fabricated on a plurality of notional horizontal planes (not shown) spaced apart from one another, thereby the core beads 261 forming a stack of horizontal layers. Due to the curved side-wall geometry of the object 260, end surfaces 262 of the beads 261 have formed a stepped appearance. Side-wall beads 263 are fabricated across the end surfaces 262 to cover the steps, thereby forming a smooth side-wall of the object 260. The side-wall beads 263 are fabricated along one or more non-planar notional surfaces (not shown) corresponding with a desired side-wall geometry, and extend in a different direction to the core beads 260, thereby cross-laminating with the core beads 260. As shown in FIGS. 26A and 26B, the side-wall beads 263 extend substantially vertically however it will be appreciated that these beads 263 may be arranged in any angled orientation relative to the core beads 261, such as a spiral wrapping around the object 260, to provide various degrees of cross-lamination.

Each side-wall bead 263 has a non-uniform thickness, as each bead 263 is fabricated to fill the stepped surfaces therebelow and form a smooth top surface. The fabrication of the smooth top surface may be caused by the apparatus 10, 20 applying pressure to each side-wall bead 263 during fabrication. The approach of fabricating core beads 261 enclosed with side-wall beads 263 can prove advantageous where the object 260 has curved outer surfaces, as the core beads 261 can be fabricated rapidly at a large thickness but forming a rough, stepped outer surfaces. The side-wall beads 263 can then be fabricated to enclose the core beads 261 and form smooth, curved outer surfaces. This may therefore reduce the time period to fabricate the object 260.

Figure 26C:
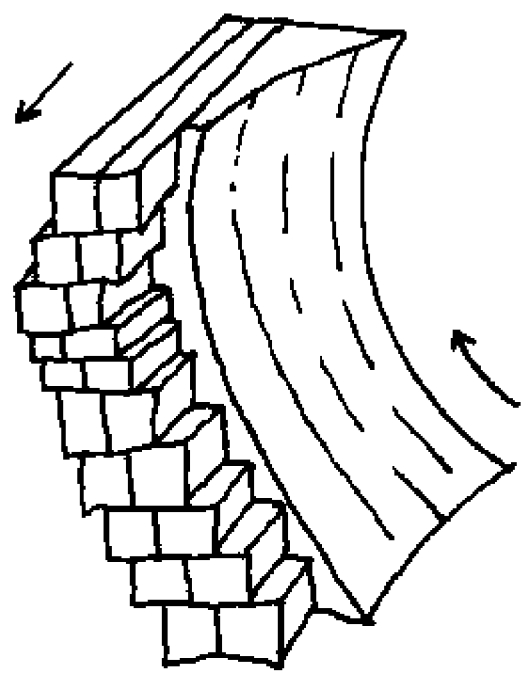

FIG. 26C shows a further variation of the object 260 comprising core beads 261 arranged horizontally and transverse to an outer surface of the object 260, such that side-walls 264 of the beads 260 form the stepped surface. Side-wall beads 263 extend substantially vertically and across the core beads 261, filling the stepped geometry and forming a smoother, curved and over-hanging outer surface.

Figure 27A:
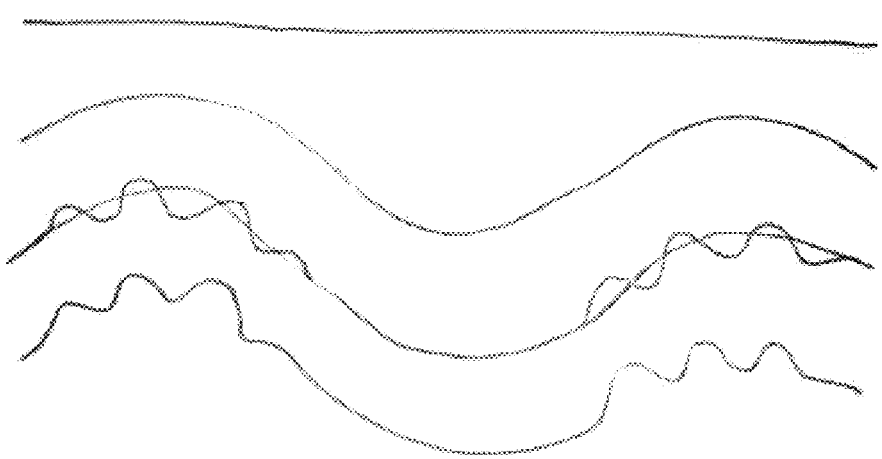
FIG. 27A are alternative waveforms generated by the wave generator.

FIG. 27A illustrates four stages of generating a compound waveform 270 by executing the wave generator algorithm as previously described.

In stage 1, a planar bead 271 or layer is generated.

In stage 2, the planar bead 271 is distorted by the wave generator, according to defined parameters such as amplitude, frequency and wavelength, to generate a parent wave 272.

In stage 3, one or more sections of the parent wave 272 are identified according to further defined parameters, such as regions of the wave 272 calculated as likely causing low adhesion in a corresponding bead of material, and the one or more sections are further distorted by the wave generator, according to further defined parameters, to generate one or more respective child waves 273 arranged along the parent wave 272.

In stage 4, the parent wave 272 and child waves 273 are combined to form the compound waveform 270. This is then used to control the apparatus 10, 20 to fabricate a non-uniform thickness bead of the material having geometry corresponding with the compound waveform 270.

Figure 27B:
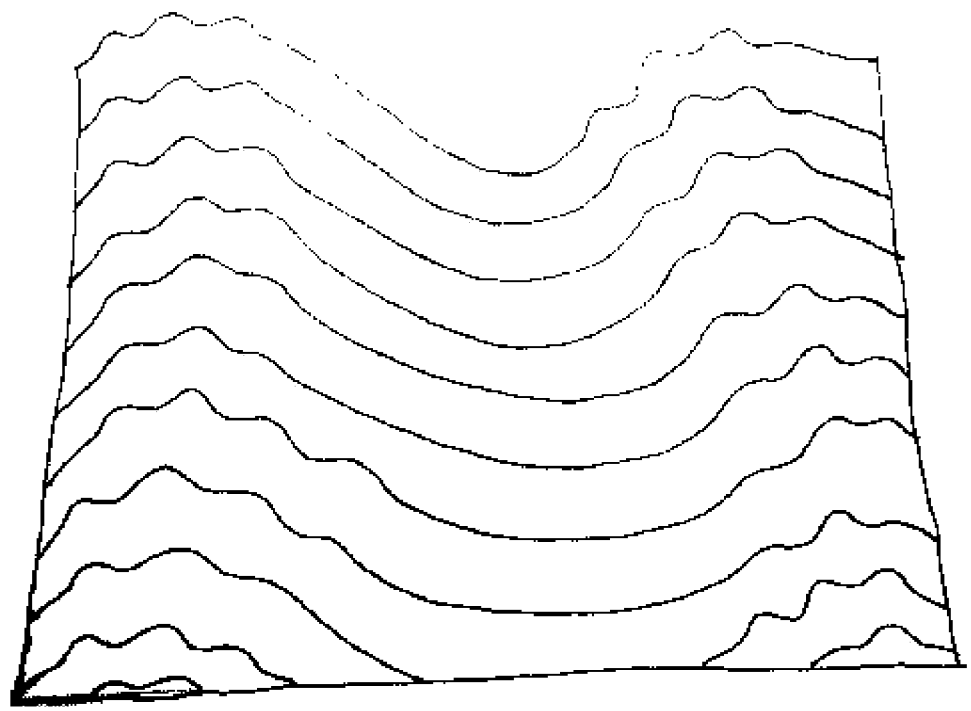
FIG. 27B is a further alternative object having geometry which embodies the waveforms shown in FIG. 27A.

FIG. 27B shows a further alternative object 274 comprising a plurality of non-uniform thickness beads 275 arranged in a stack of layers, each bead 275 substantially corresponding with the compound waveform 270. This illustrates the advantageous geometry able to be formed with the approach illustrated in FIG. 27A, as the portions of the beads 275 corresponding with the child waves 273 significantly increase contact surface area between beads 275 and consequently significantly increase adhesion between beads 275 and the strength of bond between layers.

Figure 28:
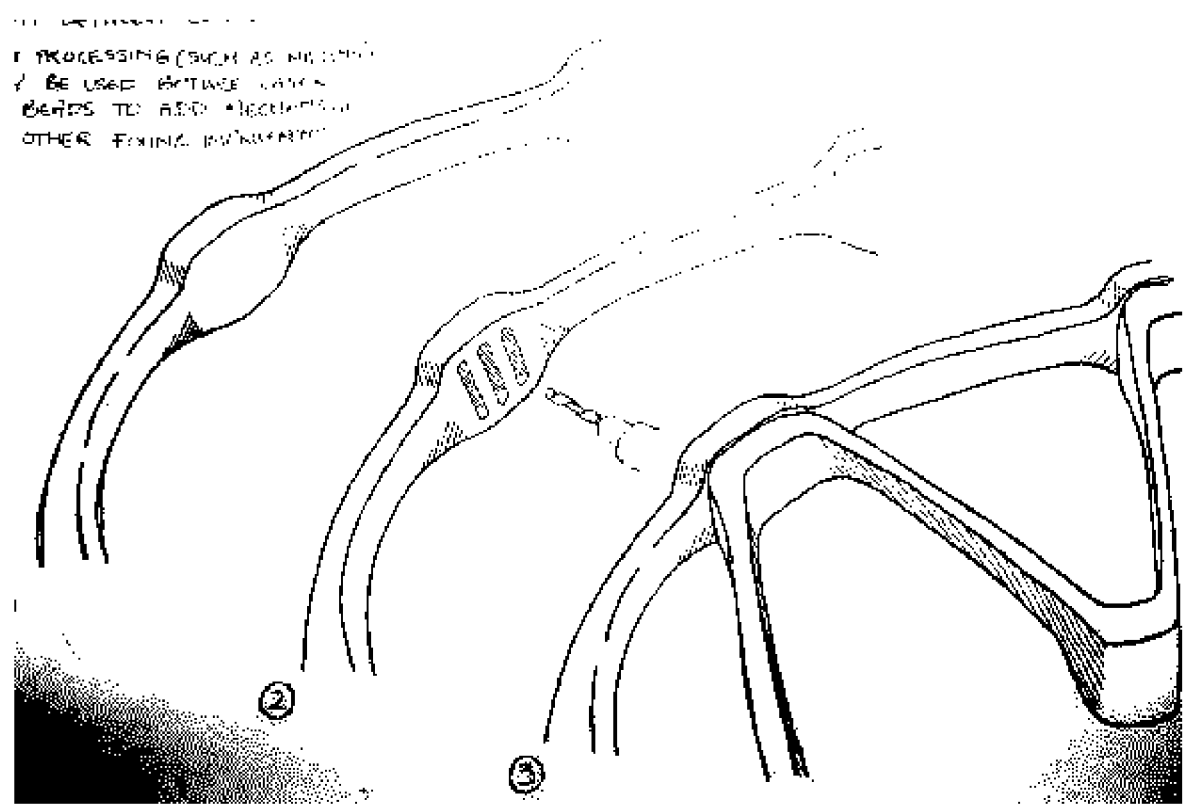
FIG. 28 illustrates the stages of fabricating a further alternative object.
Figure 1:
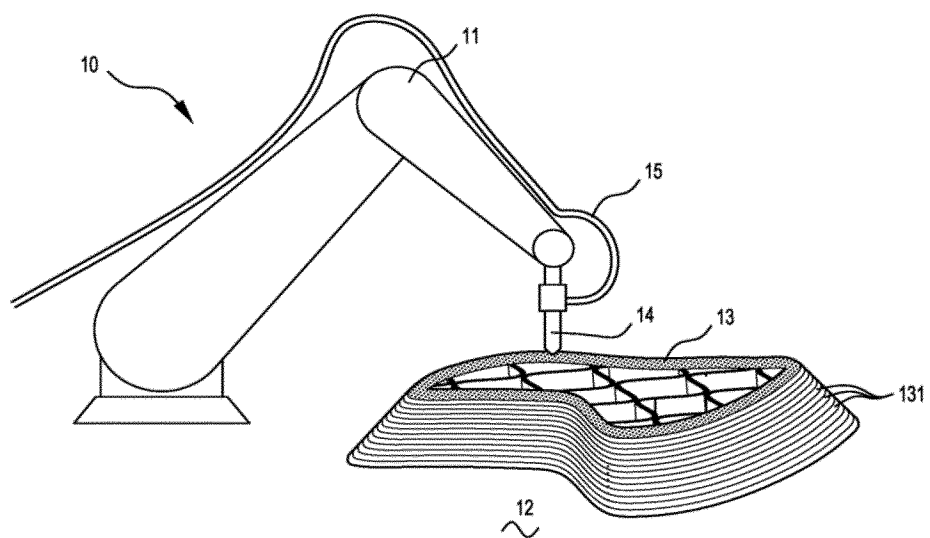
Figure 2:
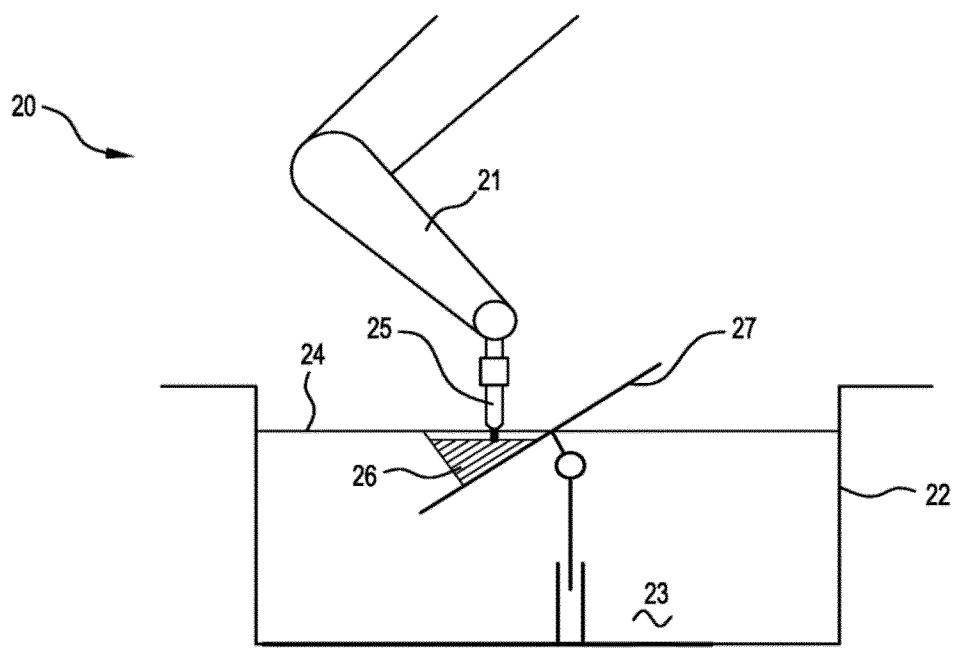
Figure 3:
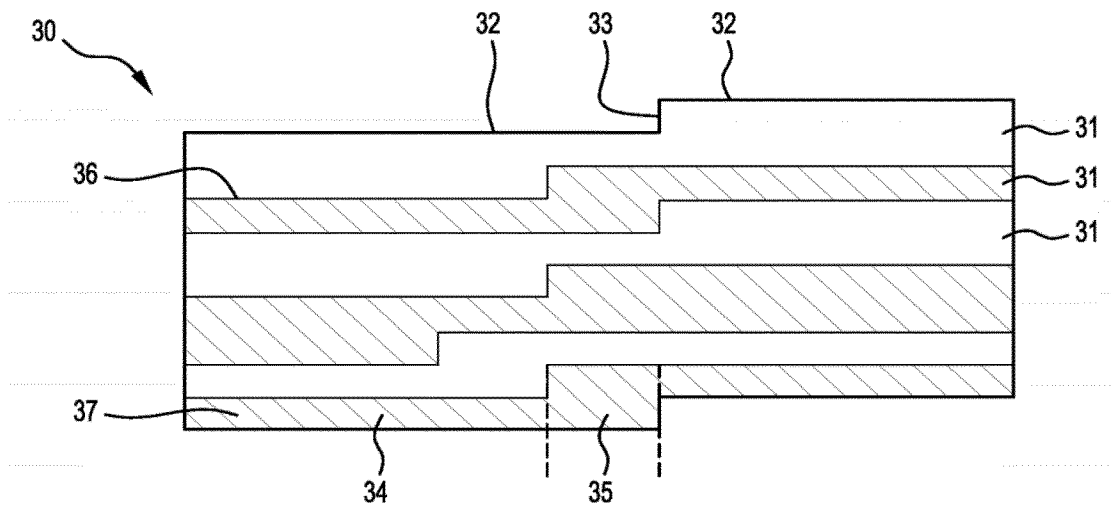
Figure 4:
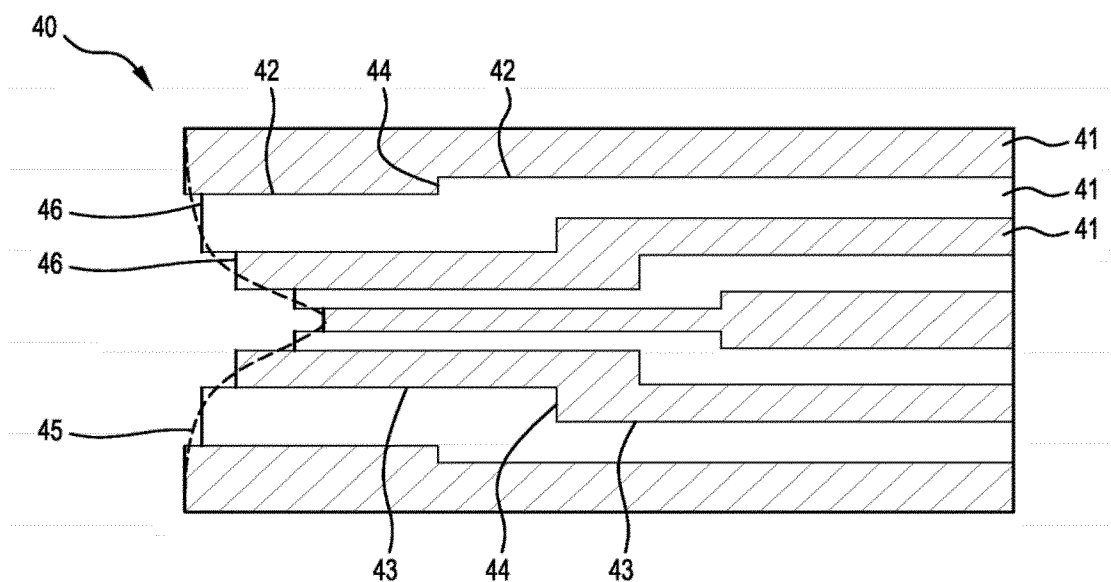
Figure 5:
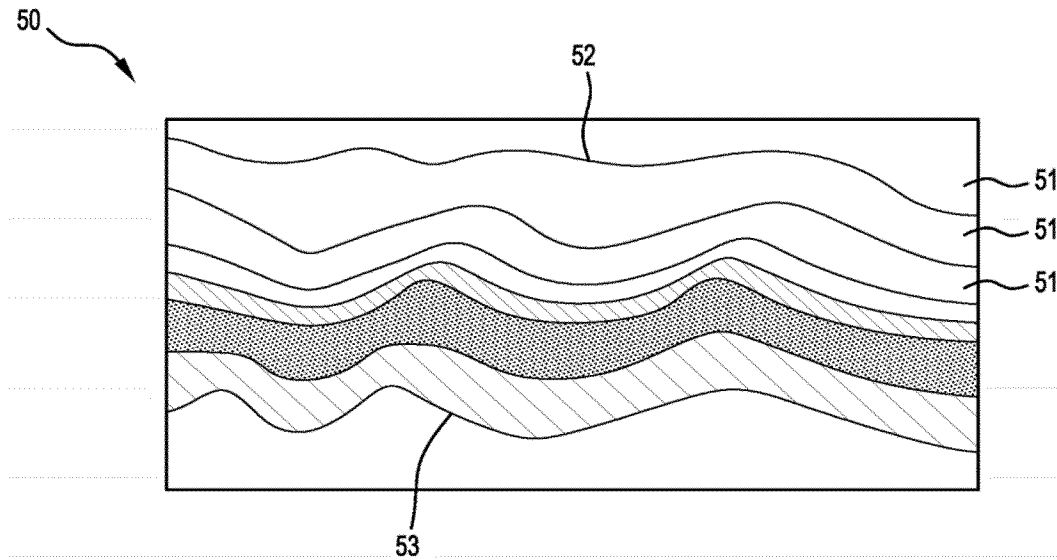
Figure 6:
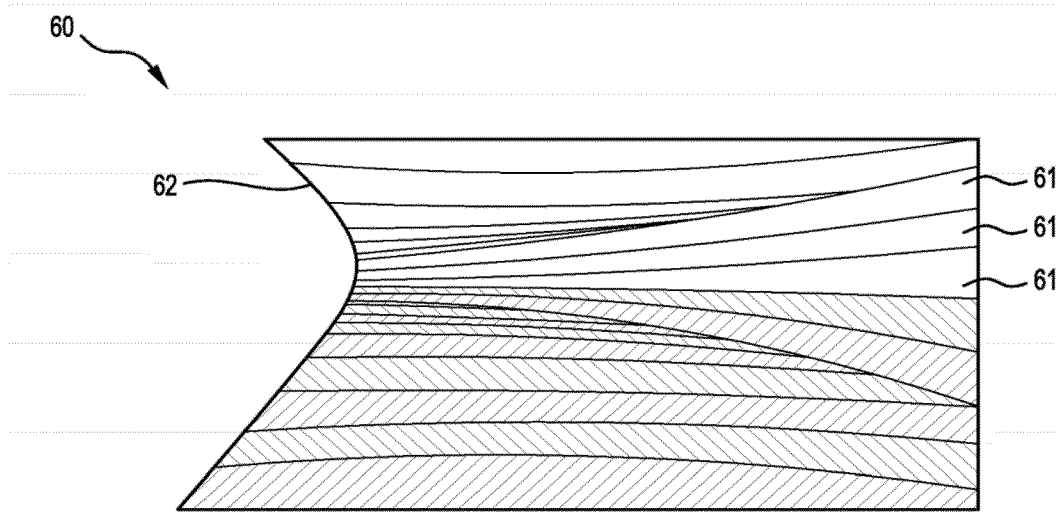
Figure 7:
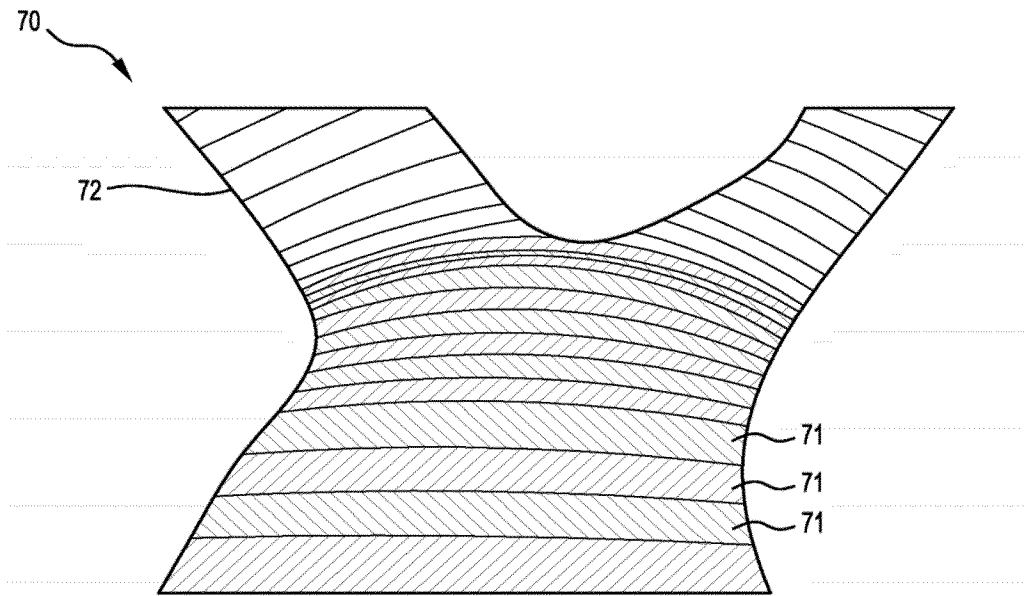
Figure 8:
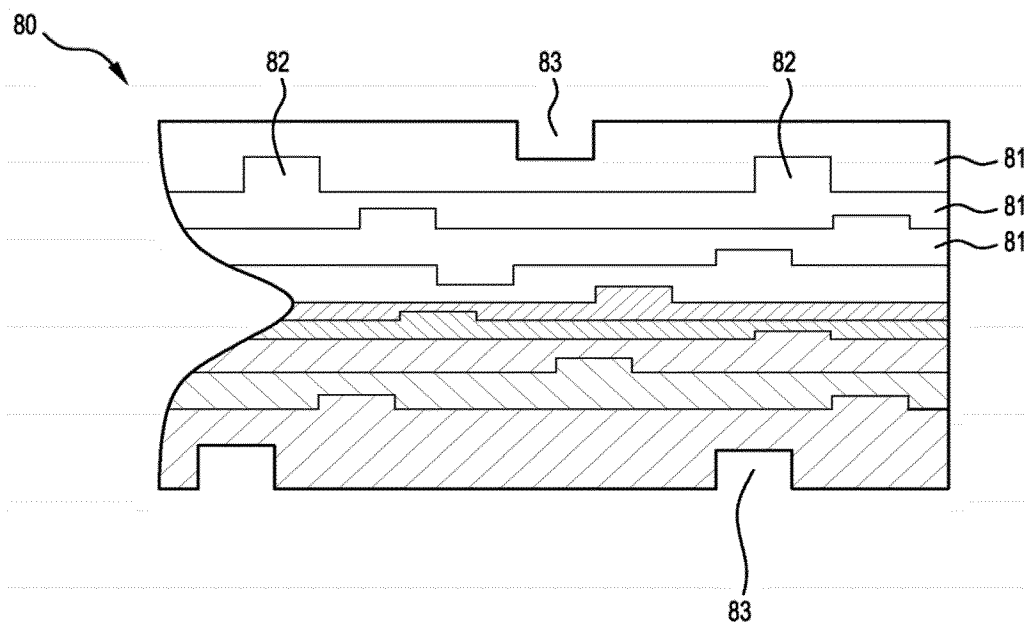
Figure 9:
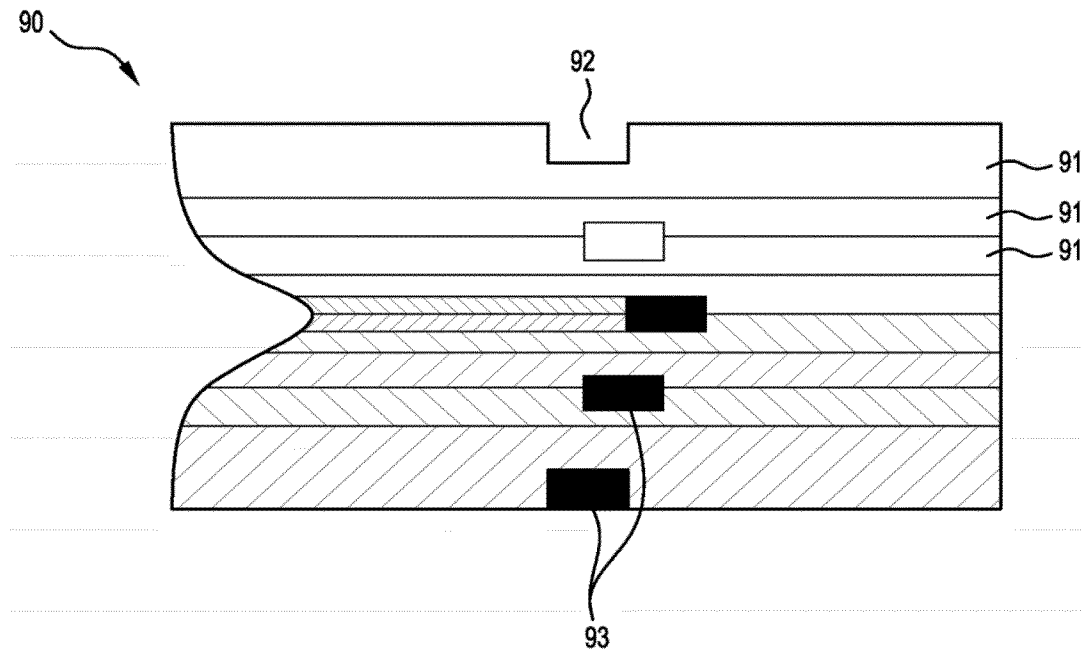
Figure 10:
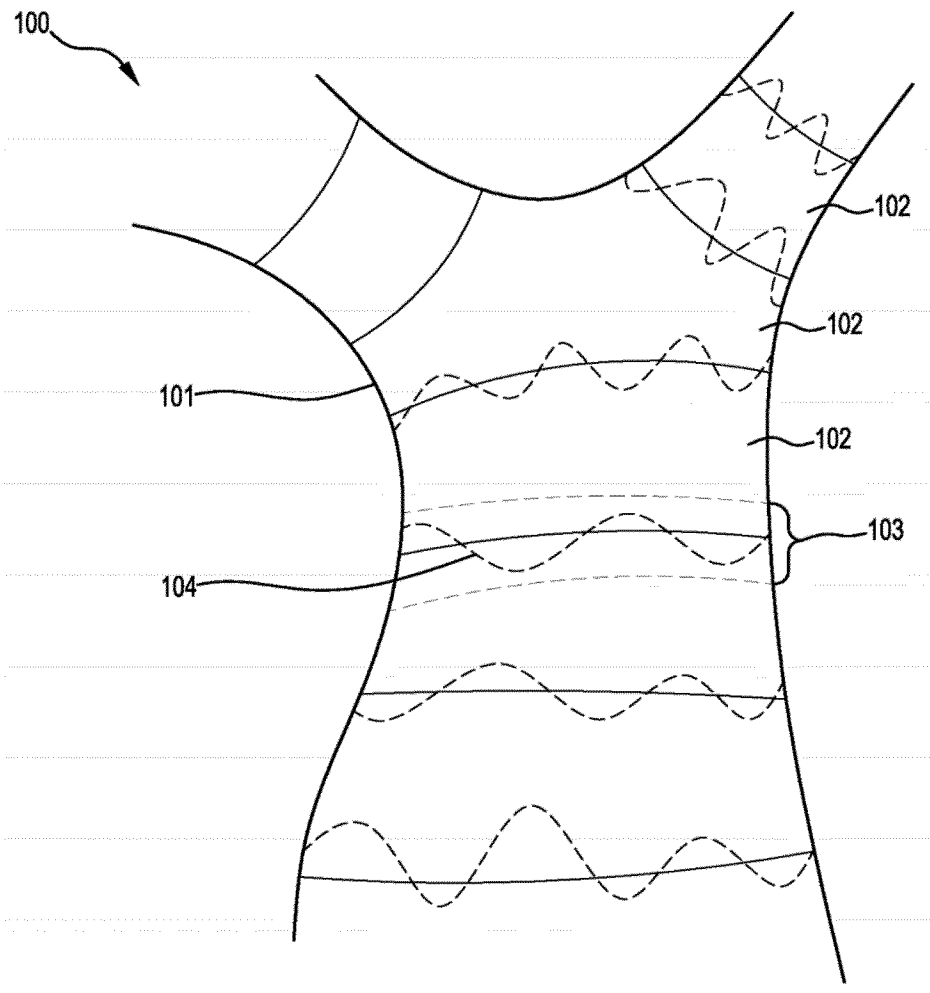
Figure 11:
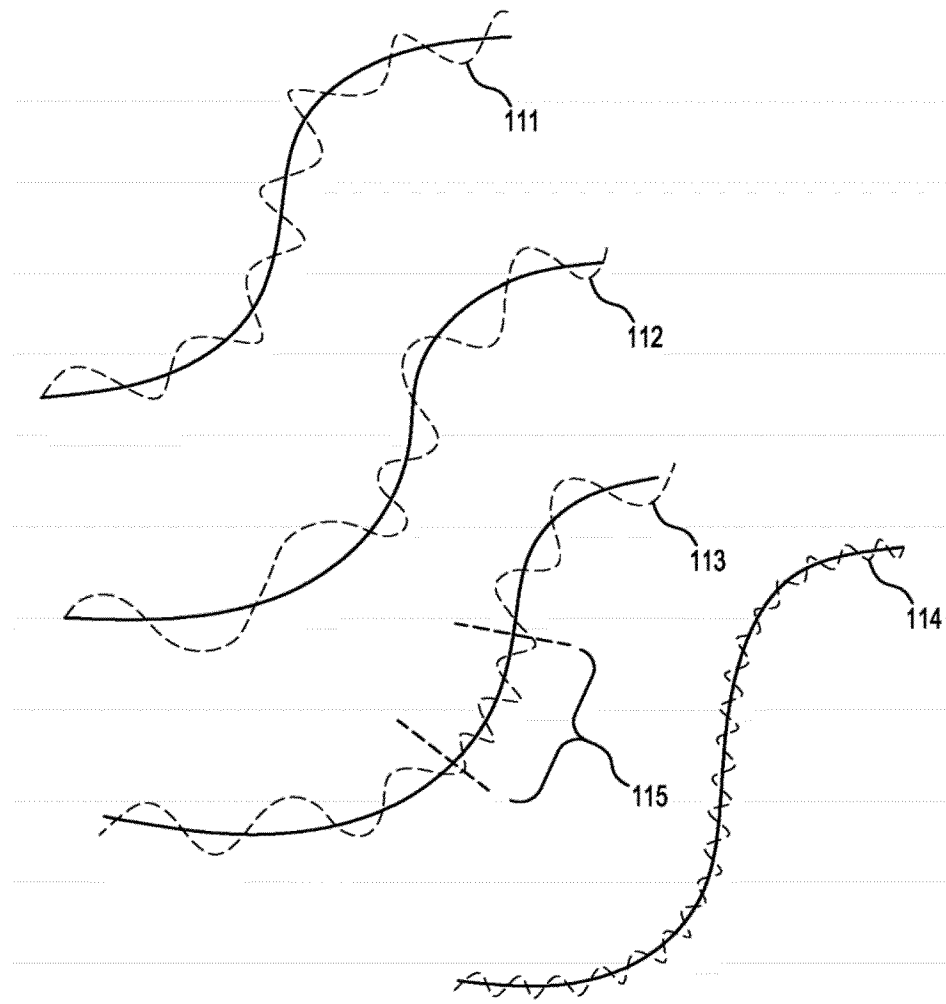
Figure 12A:
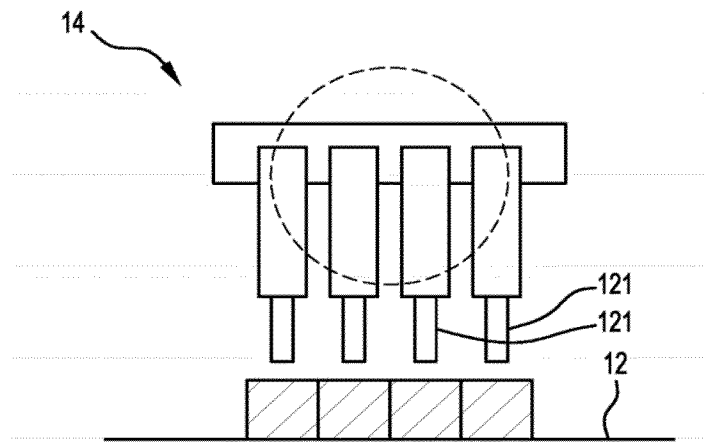
Figure 12B:
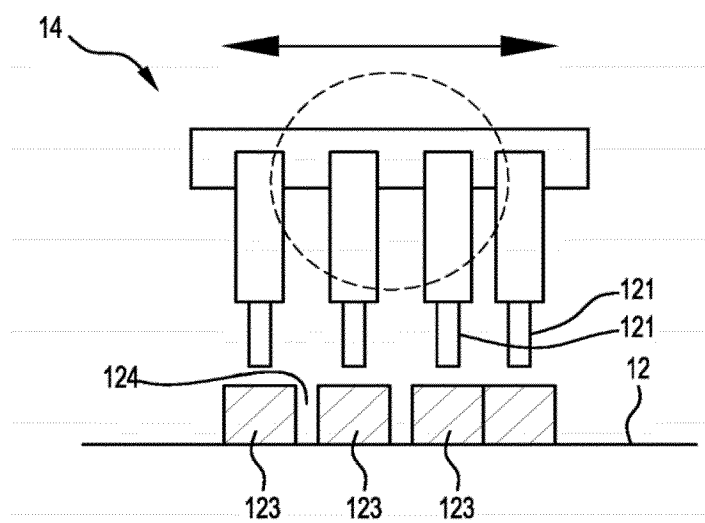
Figure 12C:
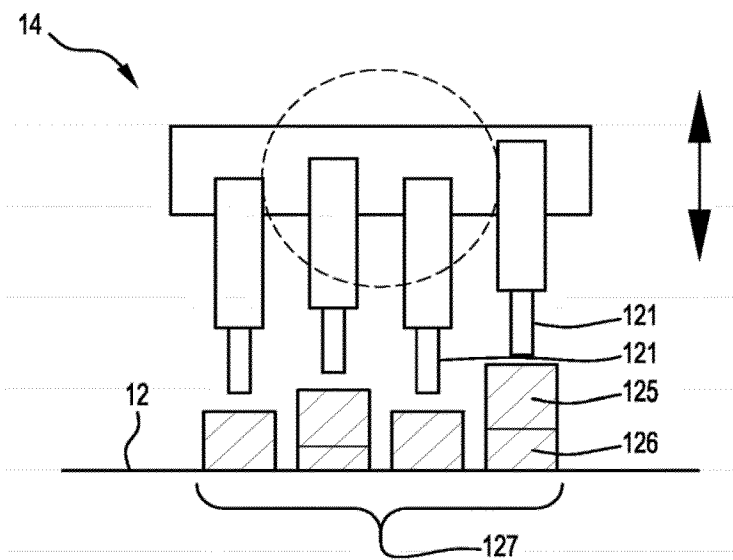
Figure 12D:
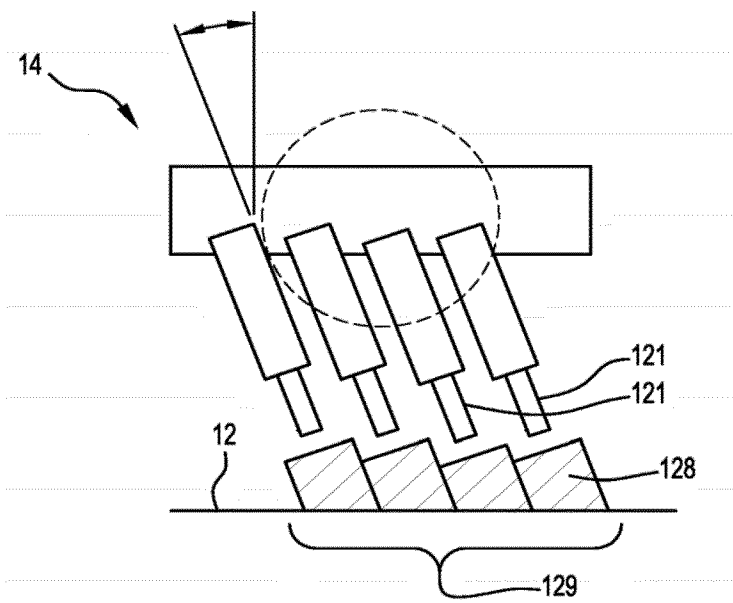
Figure 13A:
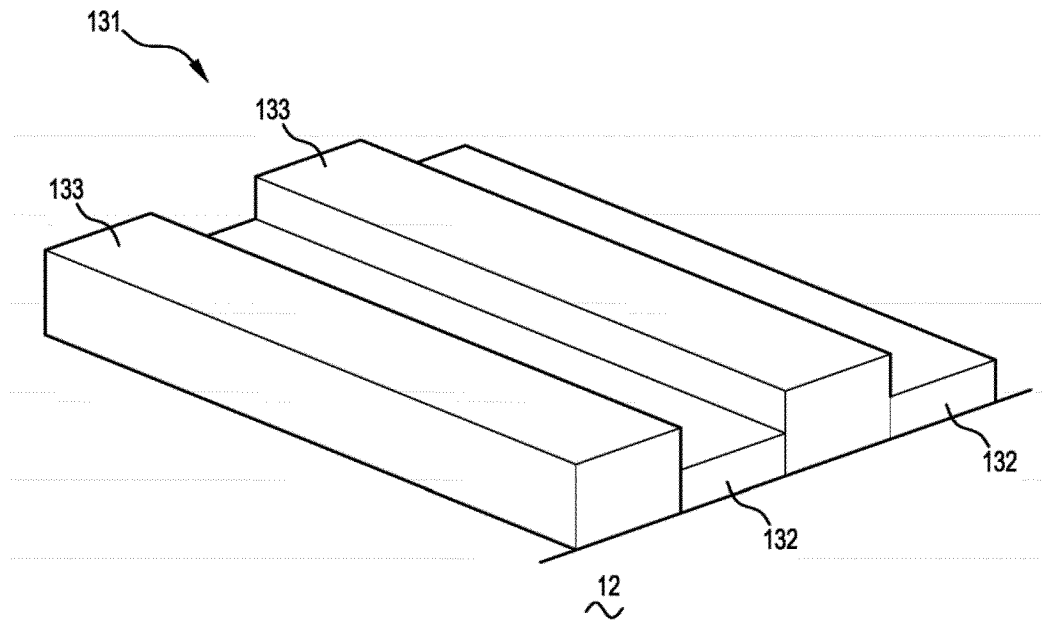
Figure 13B:
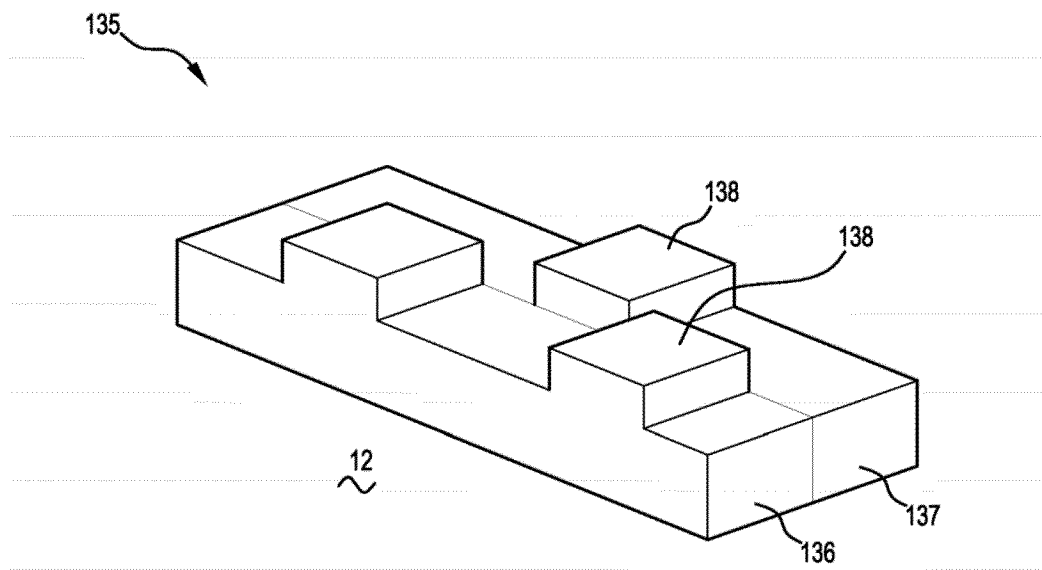
Figure 13C:
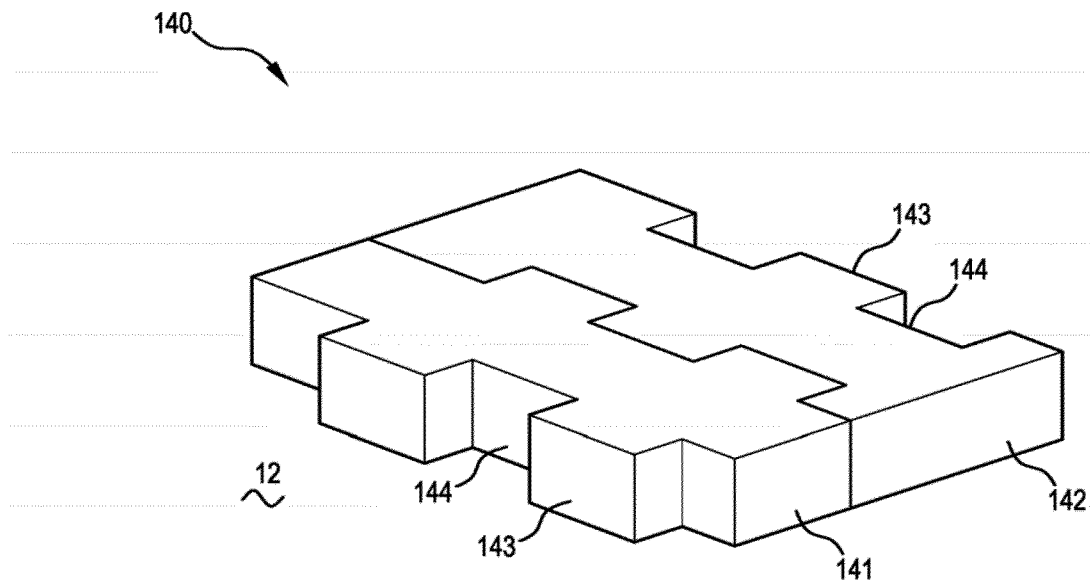
Figure 13D:
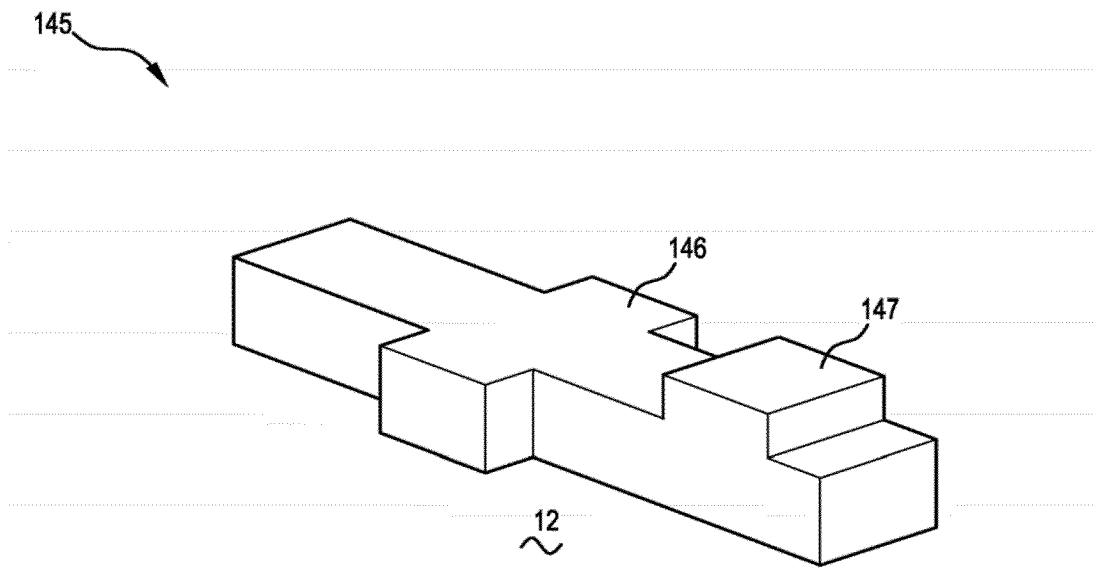
Figure 13E:
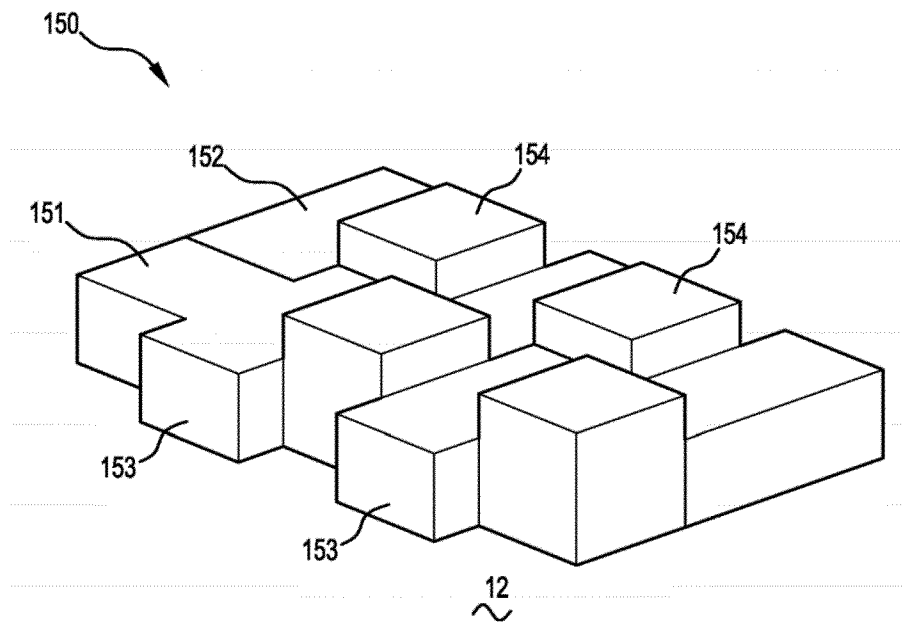
Figure 14A:
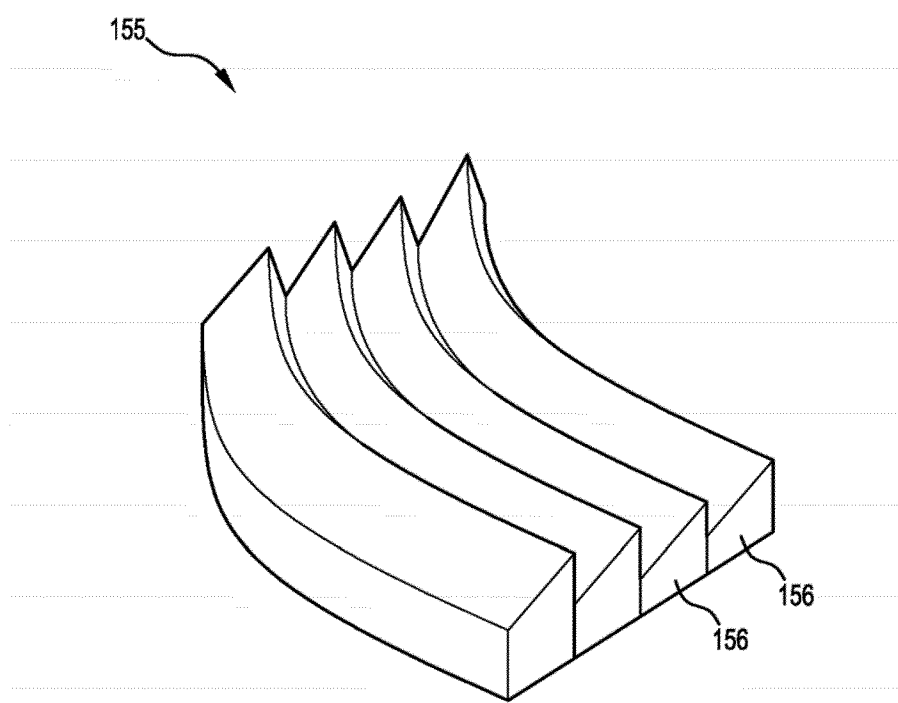
Figure 14B:
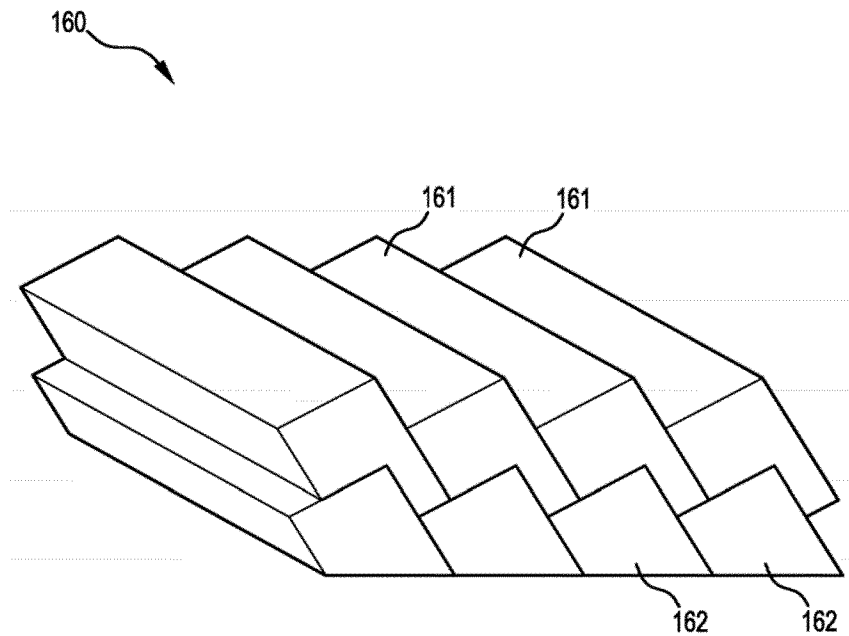
Figure 14C:
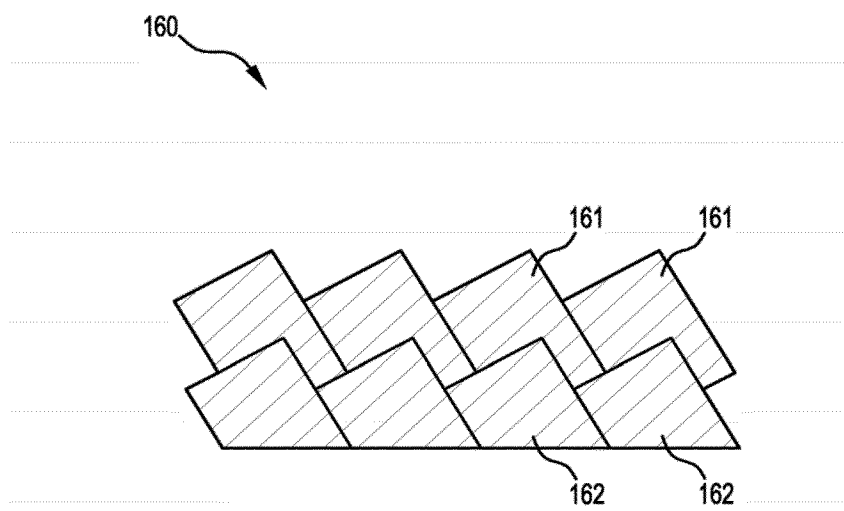
Figure 14D:
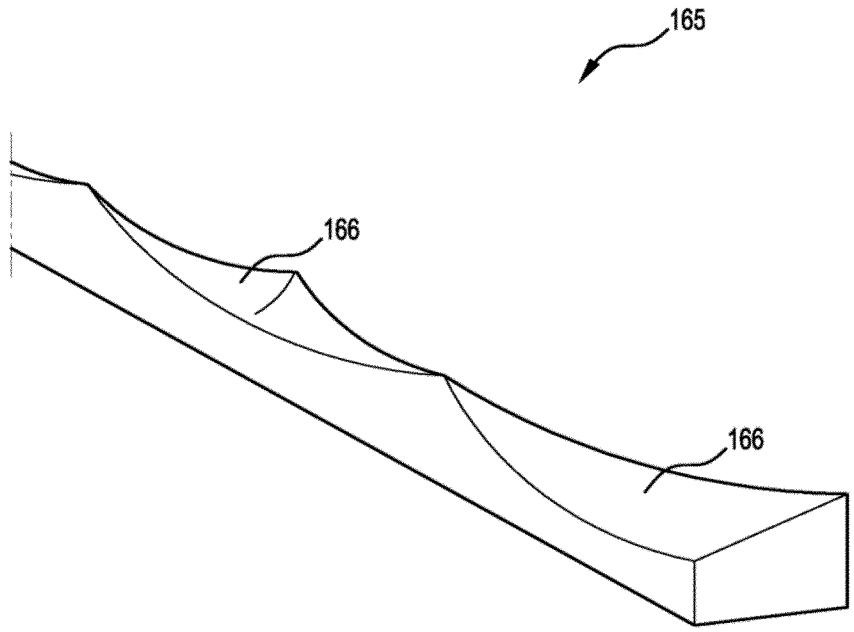
Figure 15A:
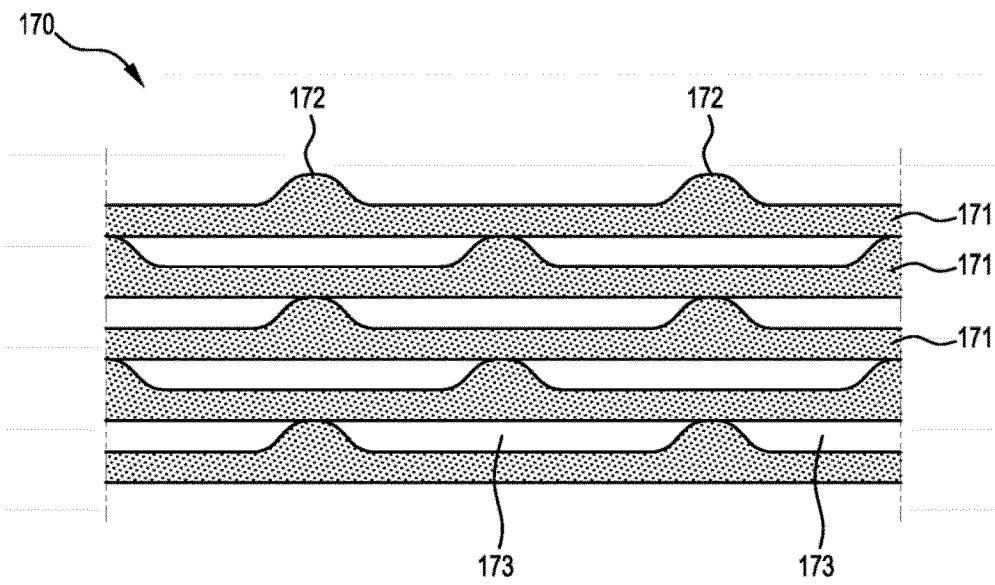
Figure 15B:
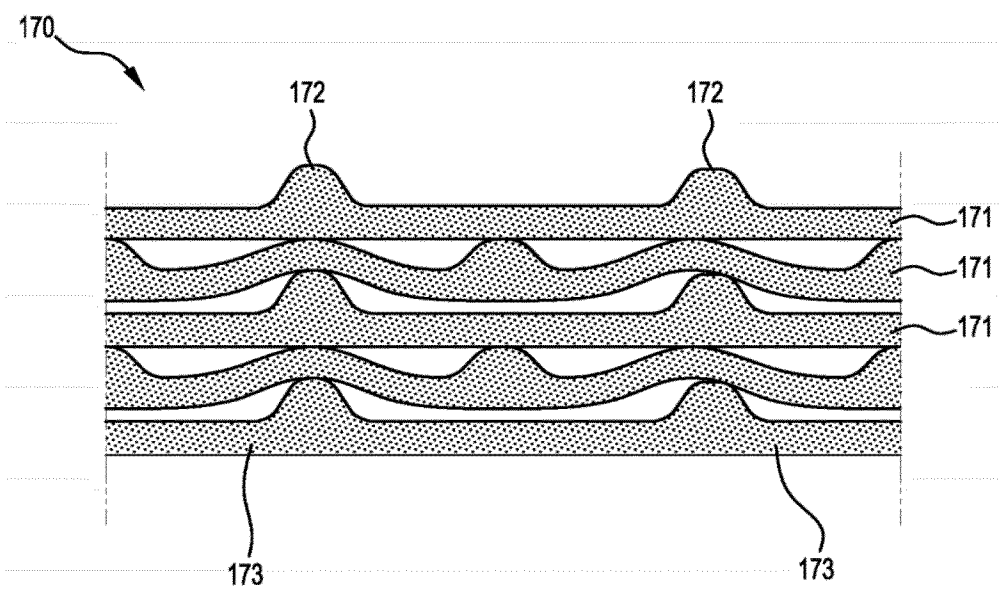
Figure 16A:
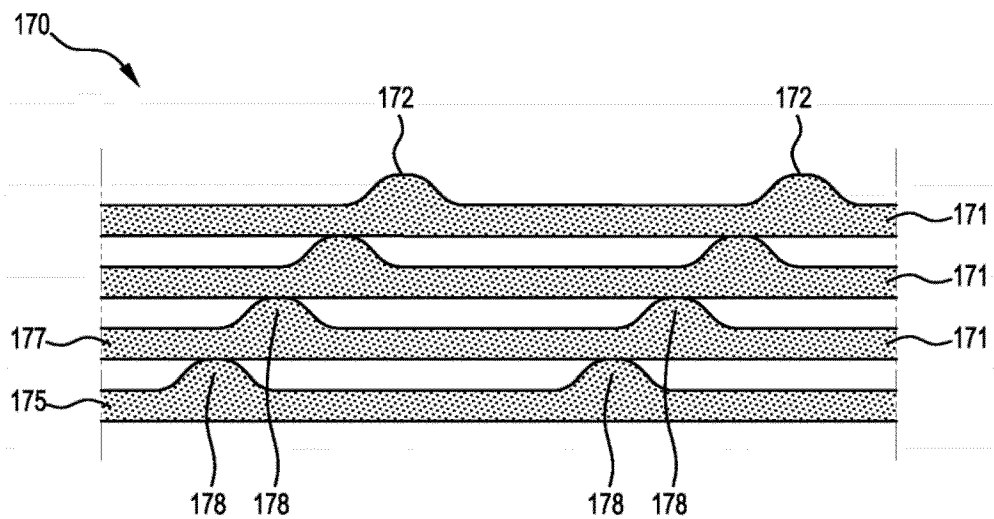
Figure 16B:
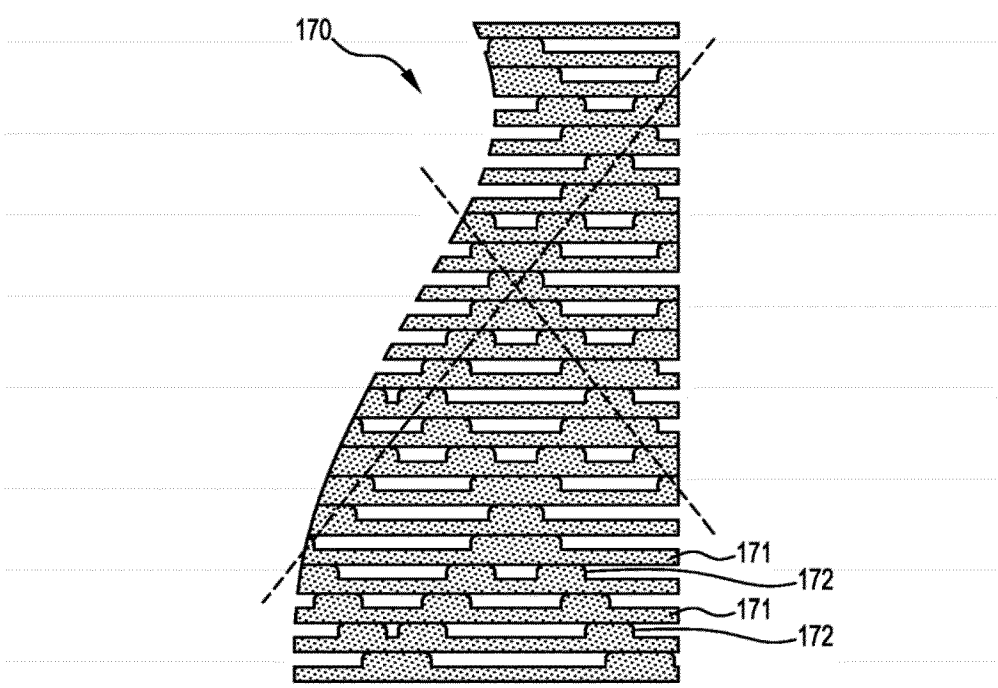
Figure 17:
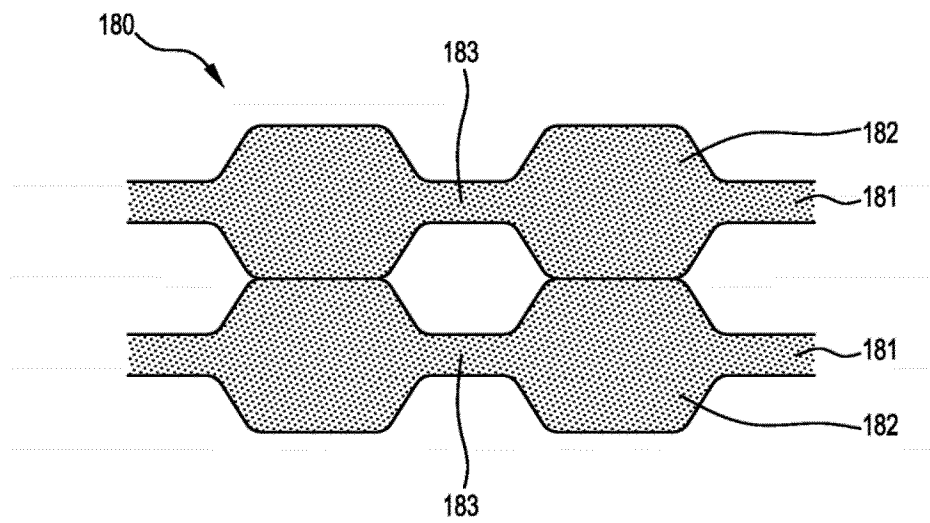
Figure 18:
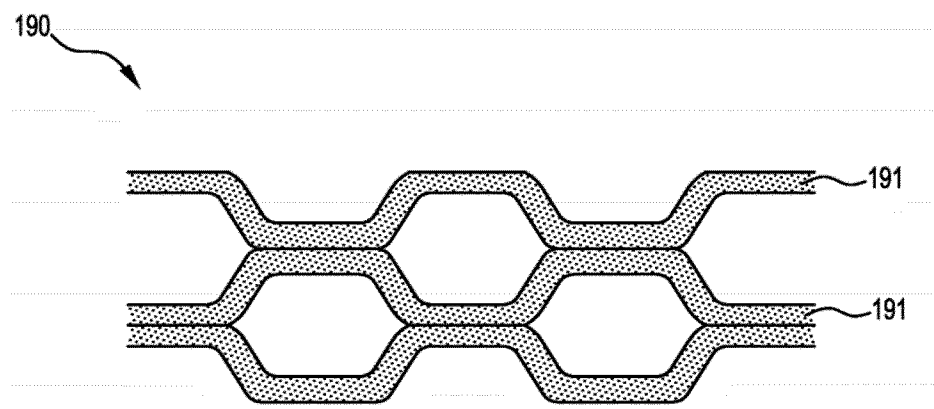
Figure 19:
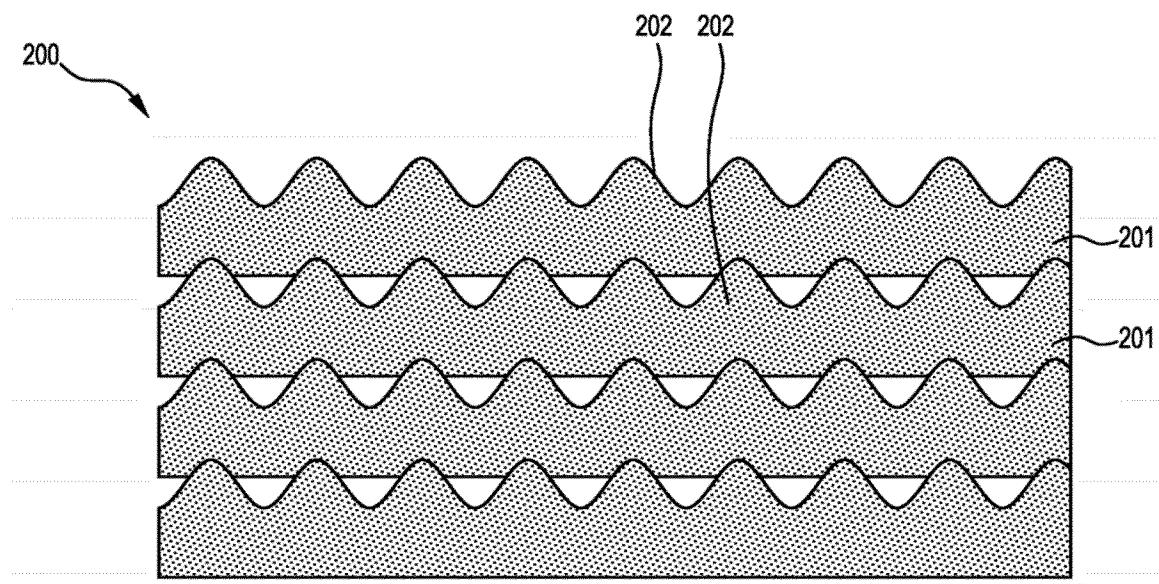
Figure 20A:
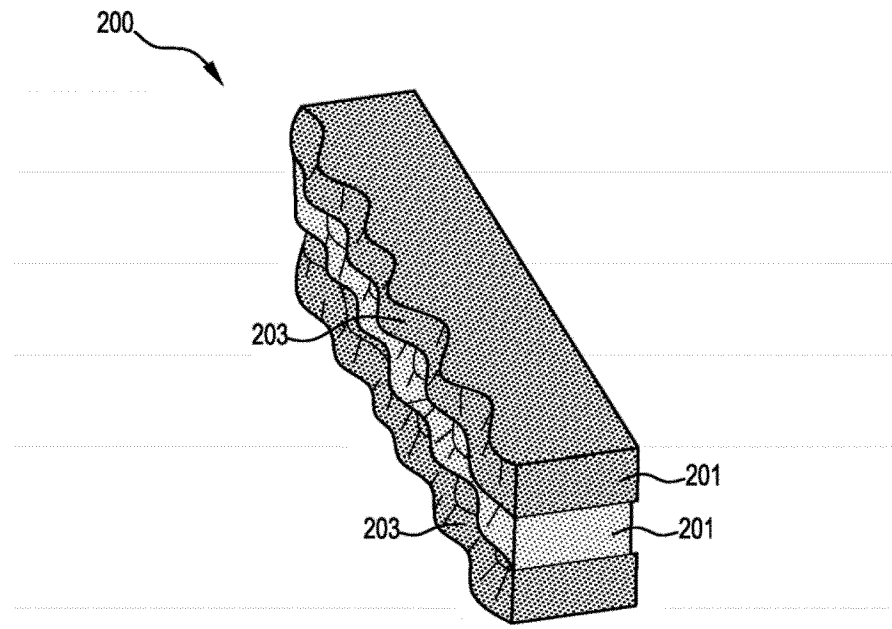
Figure 20B:
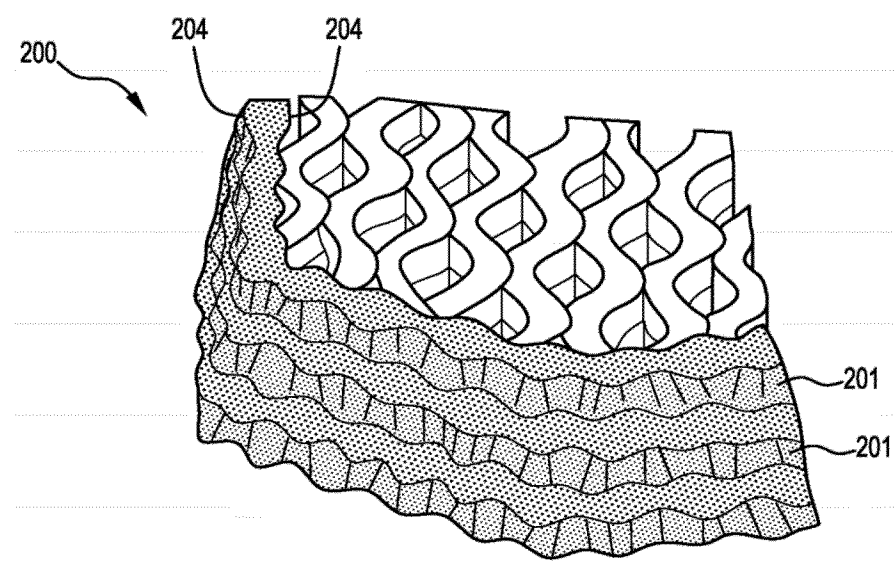
Figure 21:
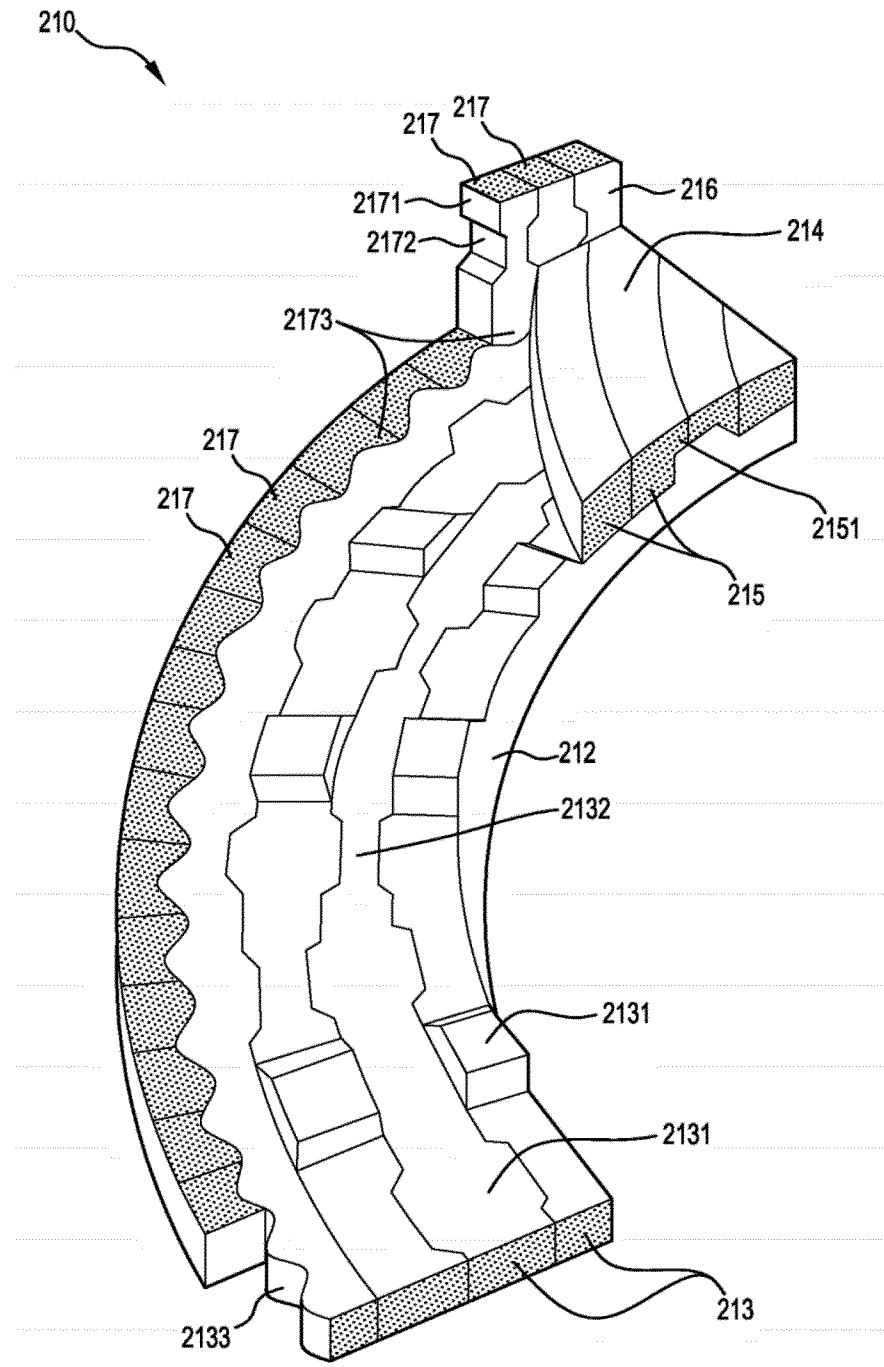
Figure 22:
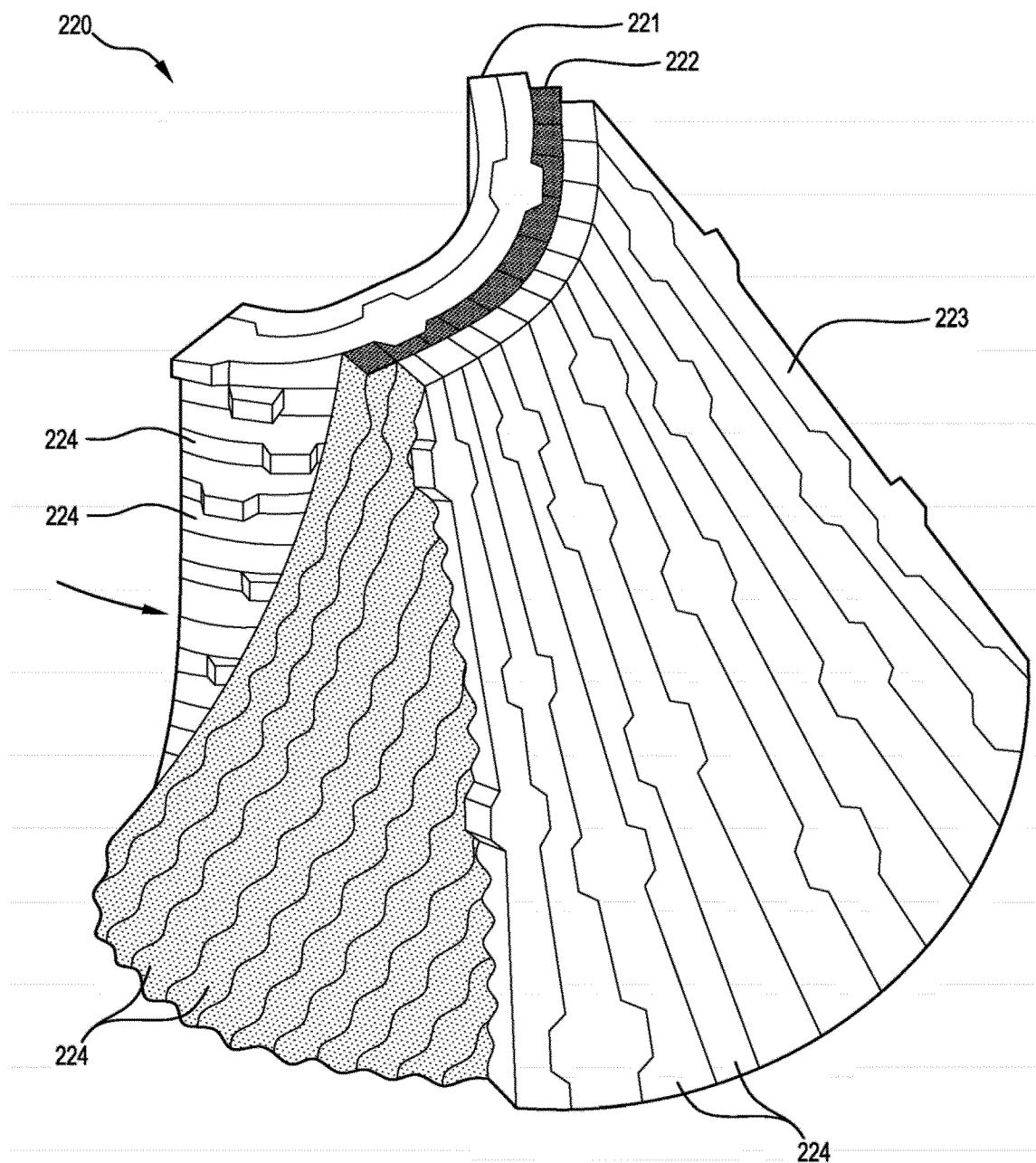
Figure 23A:
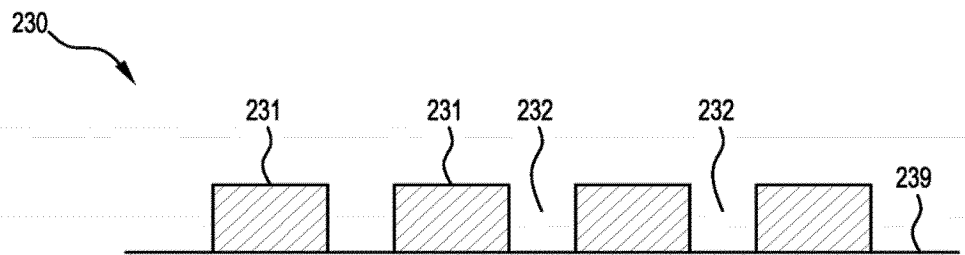
Figure 23B:
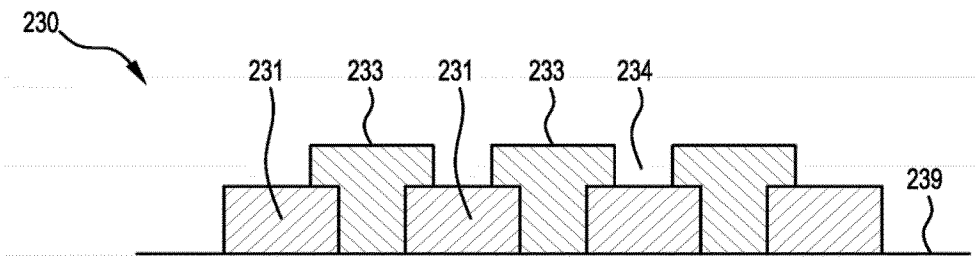
Figure 23C:
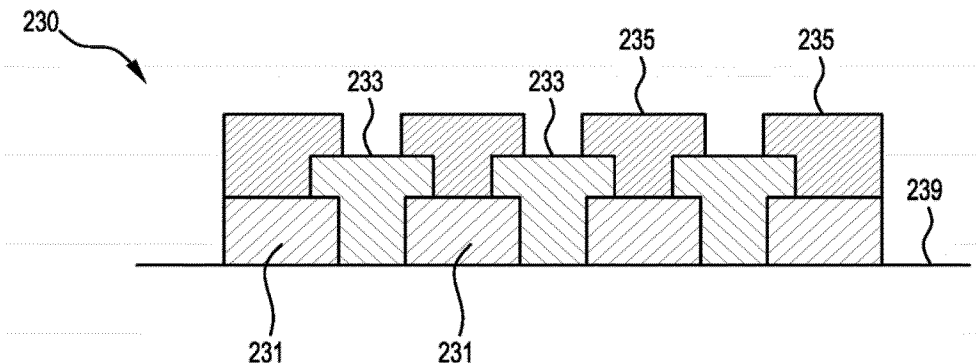
Figure 24:
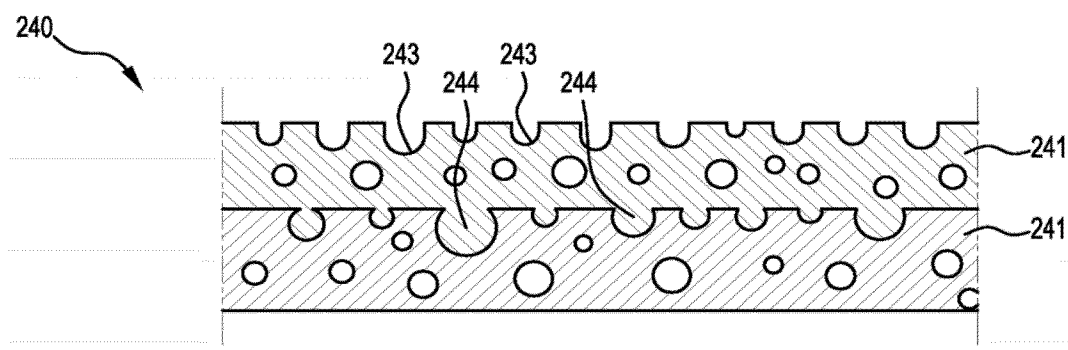
Figure 25:
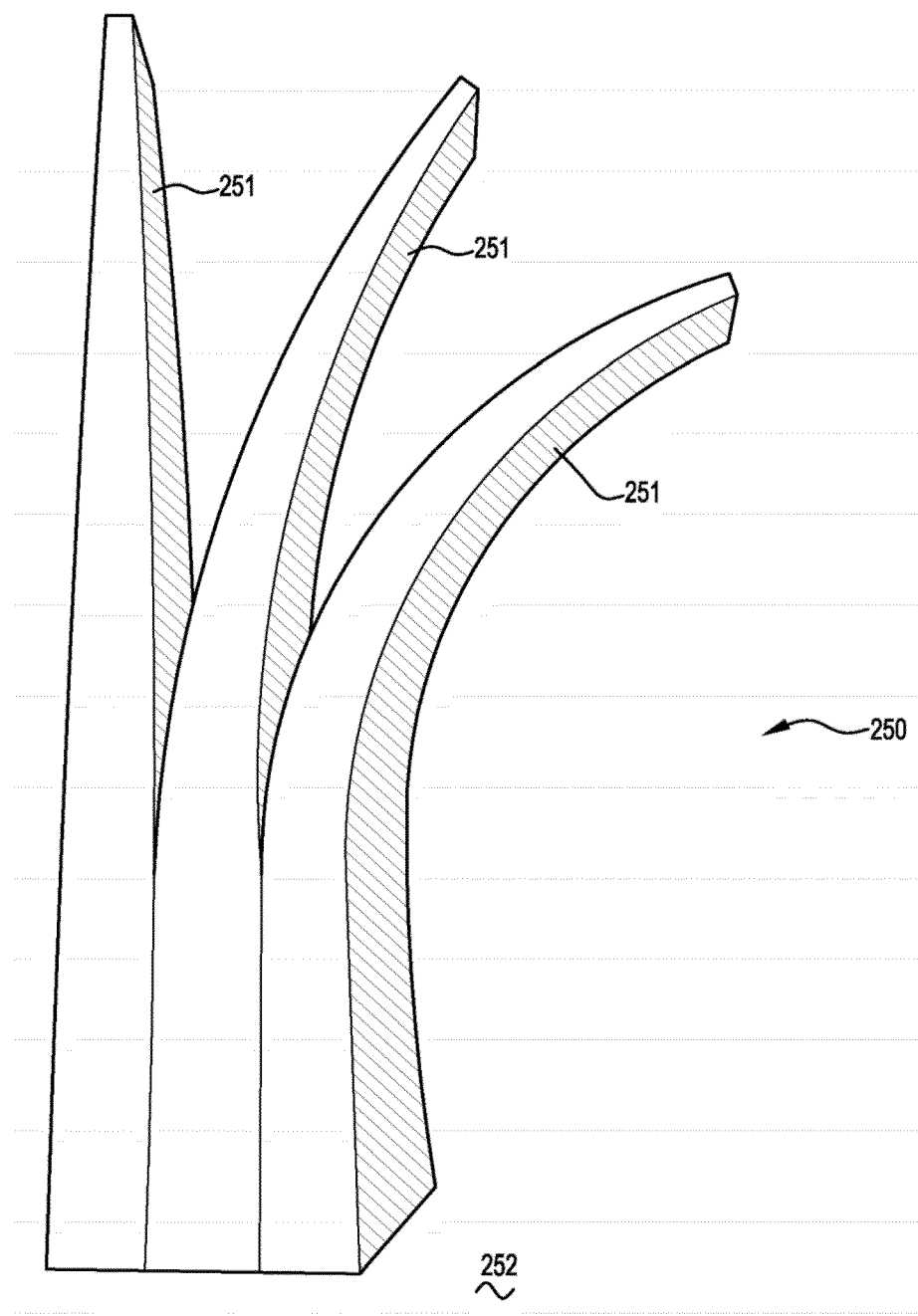
Figure 26A:
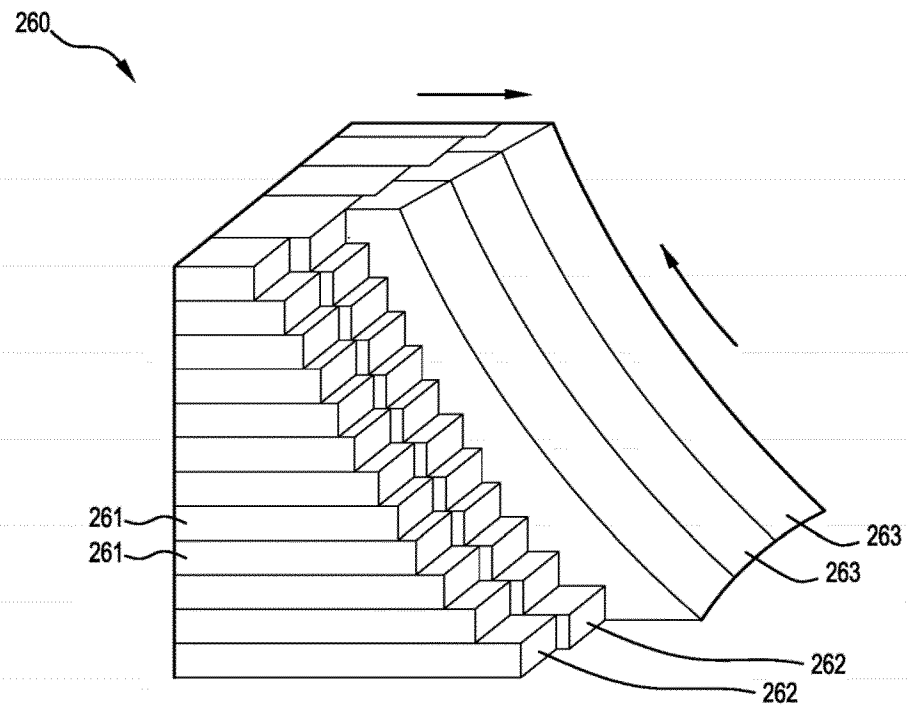
Figure 26B:
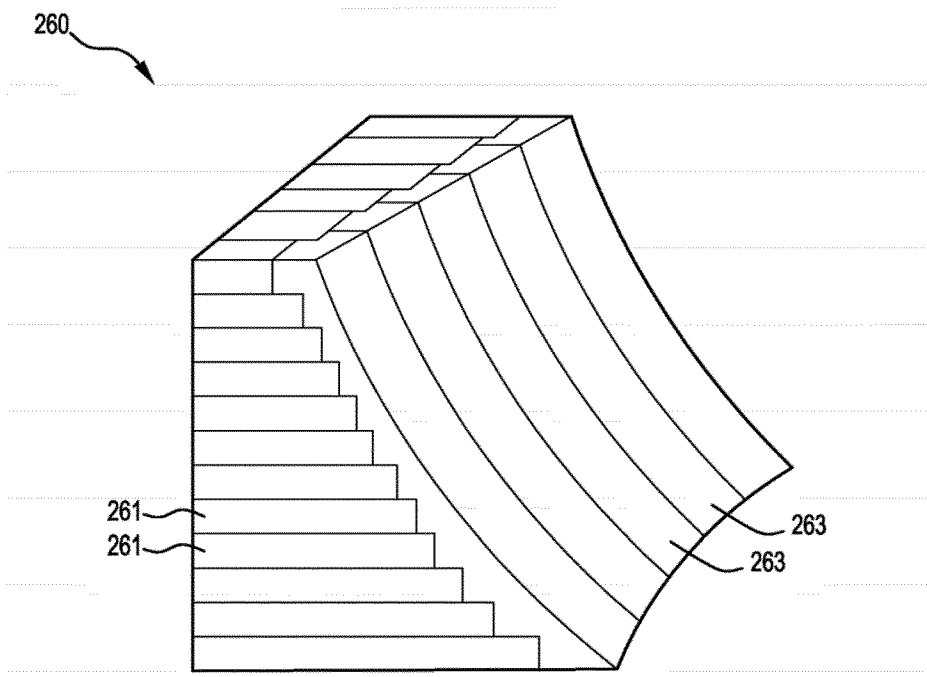
Figure 26C:
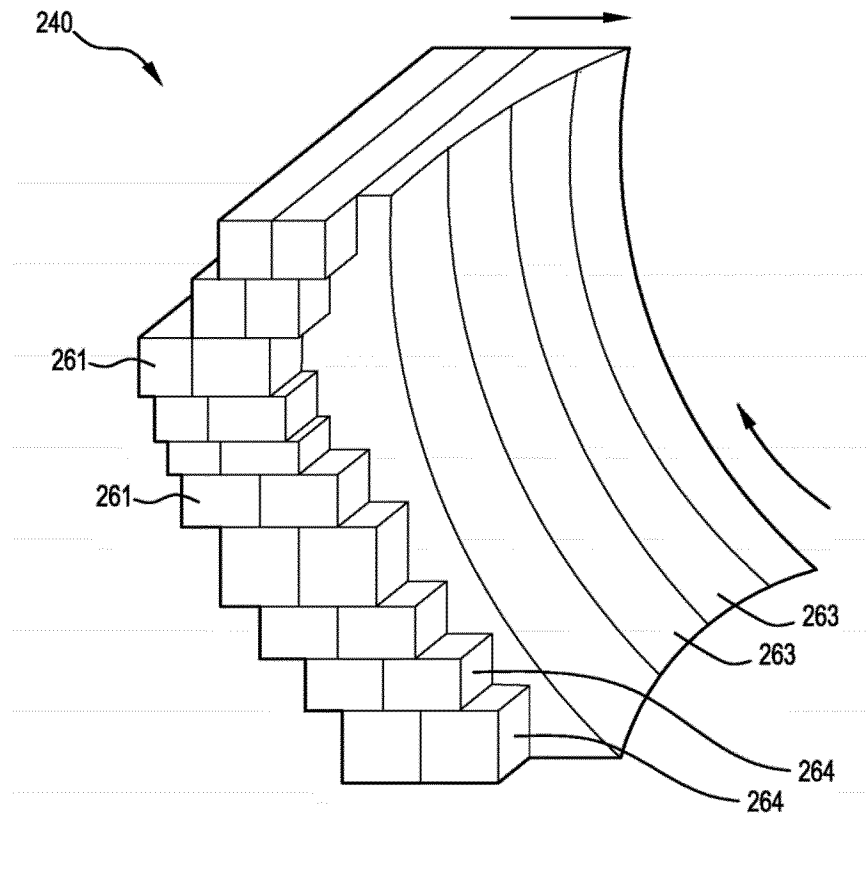
Figure 27A:
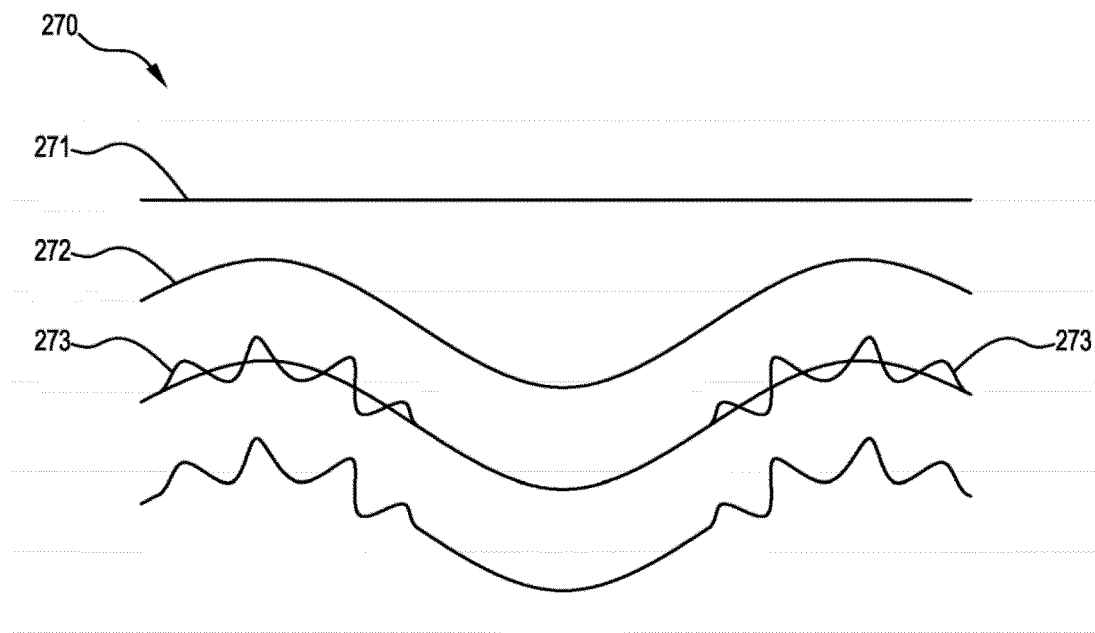
Figure 27B:
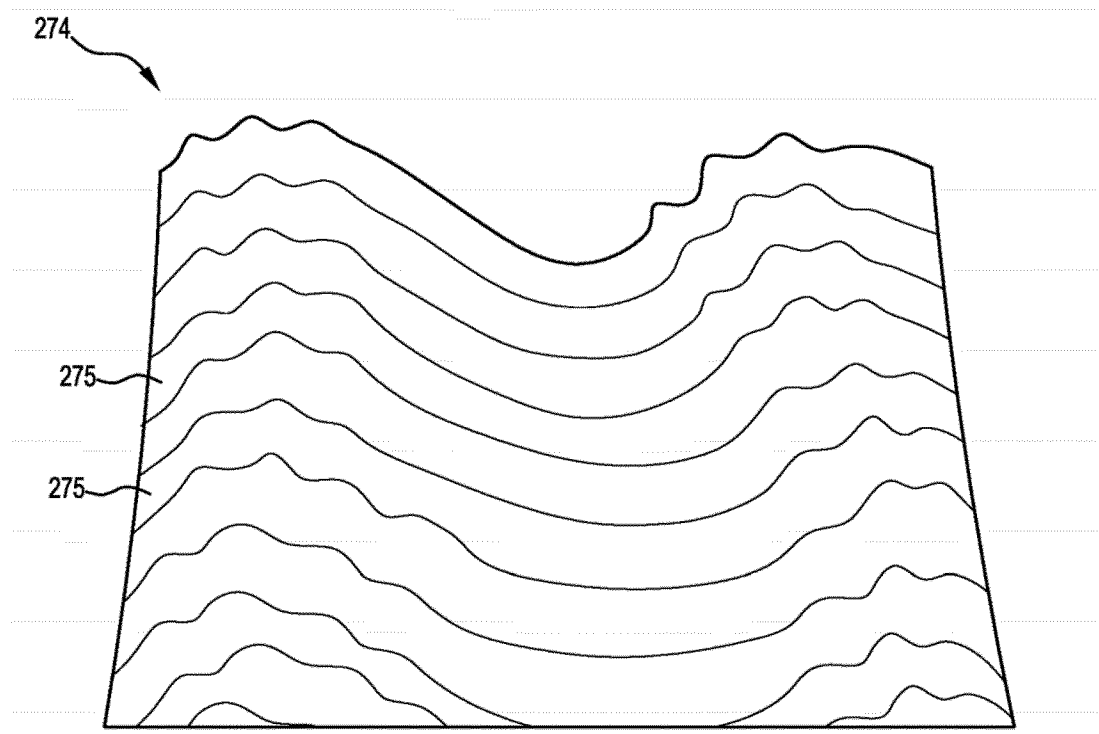
Figure 28:
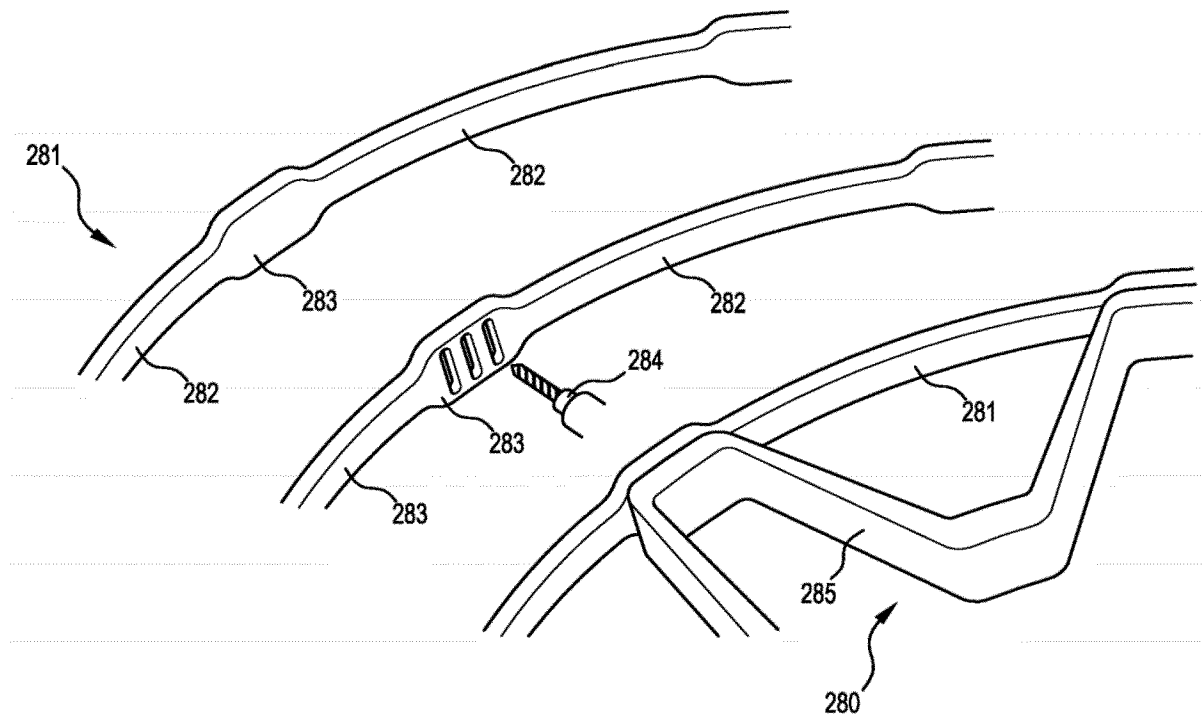

FIG. 28 illustrates three stages of fabricating a further alternative object 280.

In stage 1, a first bead 281 is fabricated having thin webs 282 extending between wide pads 283. Typically, the first bead 281 is fabricated by the deposition apparatus 10 from a self-supporting material and is formed extending into free space as an unsupported structure. However, alternatively, the bead 281 may be fabricated by any of the approaches previously described.

In stage 2, at least one pad 283 is processed to provide an engaging structure for engaging a subsequent bead. For example, as shown in FIG. 28, a milling spindle 284 may mill holes for subsequently fabricated material to penetrate and interlock with. Alternatively, a pre-fabricated structure (not shown) is inserted into the pad 283 whilst the material is soft, prior to curing. Further alternatively, the pad 283 is treated with an abrasion compound (not shown), to roughen surfaces of the pad 283.

In stage 3, a second bead 285 is fabricated abutting and bonding to the pads 283, thereby forming the object 280. Optionally, each junction between the second bead 285 and first bead 281 may also be milled by the milling spindle to form an aperture (not shown) for a fastener to be secured therethrough, to affix the second bead 285 to the first bead 281.

It will be apparent that obvious variations or modifications may be made which are in accordance with the spirit of the invention and which are intended to be part of the invention.

The invention claimed is:

1. A method for fabricating an object using a computer-controlled apparatus, the apparatus having a fabrication head for selectively fabricating material and a build area for receiving the fabricated material, at least one of the fabrication head and build area being movable relative to each other and the fabrication head being selectively operable to fabricate the material responsive to computer instructions, the method comprising the steps of:

receiving, by the apparatus, computer instructions relating to the object geometry; and moving at least one of the fabrication head and the build area, and selectively operating the fabrication head, to fabricate two beads of the material in the build area adjacent to and abutting each other, each of the beads corresponding with a respective portion of the object geometry and having non-uniform thickness such that the two beads have interlocking complementary geometry, wherein fabricating each bead further comprises adjusting a thickness dimension of the bead simultaneously with moving that at least one of the fabrication head and the build area.

2. The method for fabricating an object according to claim 1, wherein adjusting the thickness of one of the beads further comprises the step of forming a protrusion extending from the bead, and adjusting the thickness of the bead further comprises the step of forming a recess dimensioned to at least partially receive the protrusion.

3. The method for fabricating an object according to claim 1, wherein adjusting the thickness of one of the beads further comprises the step of forming a first projection extending vertically from the bead, and wherein fabricating the bead further comprises adjusting a width of the bead to form a second projection extending horizontally from the bead.

4. The method for fabricating an object according to claim 1, wherein the step of fabricating the two beads further comprises fabricating one of the beads overlaying and extending at an angle to the other bead.

5. The method for fabricating an object according to claim 1, wherein the step of fabricating one of the beads further comprises fabricating two separate portions of the bead spaced apart from each other to define a cavity therebetween, and the step of fabricating the other bead further comprises increasing the thickness dimension so that the bead extends into the cavity.

6. The method for fabricating an object according to claim 1, wherein the build area further comprises a planar surface and the step of fabricating at least one of the two beads further comprises simultaneously moving the fabrication head parallel and perpendicular relative to the planar surface.

7. The method for fabricating an object according to claim 6, wherein the step of fabricating the at least one of the two beads further comprises simultaneously moving the fabrication head at a constant speed, varying a distance between the fabrication head and the planar surface, and varying a volumetric rate of the material being fabricated.

8. The method for fabricating an object according to claim 6, wherein the step of fabricating at least one of the two beads further comprises simultaneously moving the fabrication head at a variable speed, varying a distance between the fabrication head and the planar surface, and maintaining a volumetric rate of the material being fabricated at a constant.

9. The method for fabricating an object according to claim 6, wherein the fabrication head further comprises an array of fabrication nozzles adapted to fabricate material, at least one nozzle in the array being movable, and wherein the step of fabricating the at least one of the two beads further comprises moving the at least one nozzle to be at least one of spaced further from the planar surface than an adjacent nozzle and spaced apart from an adjacent nozzle.

10. The method for fabricating an object according to claim 6, wherein the at least one nozzle is rotatable and wherein the step of fabricating the at least one of the two beads further comprises rotating the at least one nozzle to be at an angle to the planar surface.

* * * * *

UNITED STATES PATENT AND TRADEMARK OFFICE
CERTIFICATE OF CORRECTION

PATENT NO. : 10,668,707 B2
APPLICATION NO. : 15/502108
DATED : June 2, 2020
INVENTOR(S) : James Bruce Gardiner It is certified that error appears in the above-identified patent and that said Letters Patent is hereby corrected as shown below:

In the Drawings

The drawing Sheets 1 of 29, consisting of Figs. 1-28, should be replaced with the corrected drawing Figs. 1-28, as shown on attached pages.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*